US 12,541,906 B2

(12) United States Patent
Huang

(10) Patent No.: US 12,541,906 B2
(45) Date of Patent: Feb. 3, 2026

(54) VIRTUAL SCENE-BASED RENDERING METHOD AND APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Zheng Huang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 276 days.

(21) Appl. No.: 18/203,504

(22) Filed: May 30, 2023

(65) Prior Publication Data

US 2023/0306672 A1  Sep. 28, 2023

Related U.S. Application Data

(63) Continuation of application No. PCT/CN2022/119278, filed on Sep. 16, 2022.

(30) Foreign Application Priority Data

Nov. 26, 2021  (CN) .......................... 202111419447.9

(51) Int. Cl.
*G06T 19/20* (2011.01)
*G06T 1/20* (2006.01)
(Continued)

(52) U.S. Cl.
CPC .............. *G06T 15/005* (2013.01); *G06T 1/20* (2013.01); *G06T 15/205* (2013.01); *G06T 19/20* (2013.01);
(Continued)

(58) Field of Classification Search
CPC . G06T 19/20; G06T 2210/24; A63F 2300/663
See application file for complete search history.

(56) References Cited

U.S. PATENT DOCUMENTS 9,811,941 B1 * 11/2017 Hankins .................. G06T 13/60
2005/0231503 A1   10/2005 Heng et al.
(Continued)

FOREIGN PATENT DOCUMENTS

CN    103605501 A    2/2014
CN    106530411 A    3/2017
(Continued)

OTHER PUBLICATIONS

International Search Report and Written Opinion issued in International Application No. PCT/CN2022/119278 dated Dec. 13, 2022, with English translation, 15 pages.
(Continued)

*Primary Examiner* — Matthew Salvucci
(74) *Attorney, Agent, or Firm* — Crowell & Moring LLP

(57) ABSTRACT

Provided are a virtual scene-based rendering method and apparatus, an electronic device, a computer-readable storage medium, and a computer program product. The virtual scene-based rendering method includes: resolving, by a graphics processing unit (GPU), vertex fluctuation data corresponding to each vertex to be rendered in a model to be rendered to obtain a vertex fluctuation data set corresponding to the model to be rendered; dividing, by a central processing unit (CPU), the model to be rendered into a plurality of grids to be rendered, and resolving grid fluctuation data corresponding to each of the grids to be rendered to obtain a grid fluctuation data set corresponding to the plurality of grids to be rendered; rendering, by the GPU, a liquid surface to be rendered in a virtual scene-based on the vertex fluctuation data set; and rendering, by the CPU, a
(Continued)

virtual object for interacting with the liquid surface to be rendered based on the grid fluctuation data set.

18 Claims, 17 Drawing Sheets

(51) Int. Cl.
    *G06T 15/00*     (2011.01)
    *G06T 15/20*     (2011.01)

(52) U.S. Cl.
    CPC ..... *A63F 2300/663* (2013.01); *G06T 2210/24* (2013.01); *G06T 2219/2021* (2013.01)

(56) References Cited

U.S. PATENT DOCUMENTS

| | | | |
|---|---|---|---|
| 2016/0042552 A1* | 2/2016 | Mcnabb | G06T 15/005 345/424 |
| 2018/0012392 A1* | 1/2018 | Kryachko | G06T 15/005 |
| 2023/0306672 A1 | 9/2023 | Huang | |

FOREIGN PATENT DOCUMENTS

| | | |
|---|---|---|
| CN | 106534667 A | 3/2017 |
| CN | 107886562 A | 4/2018 |
| CN | 111598986 A | 8/2020 |
| CN | 112691381 A | 4/2021 |
| CN | 112734891 A | 4/2021 |
| CN | 113450443 A | 9/2021 |
| CN | 114092621 A | 2/2022 |

OTHER PUBLICATIONS

Extended European Search Report, Nov. 12, 2024, pp. 1-8, issued in European Application No. 22897317.8, European Patent Office, Munich, Germany.

European Communication pursuant to Rules 70(2) and 70a(2) EPC, November 29, 2024, p. 1, issued in European Application Number 22897317.8, European Patent Office, Munich, Germany.

Chen, Rong-Qin, Real-time Water Rendering Based on the Graphics Hardware Acceleration, 2009, pp. 1-5, School of Mathematics and Information Engineering, Taizhou University, Linhai, China.

Jeschke, Stefan, et al., Water Wave Packets, Jul. 2017, pp. 1-12, ACM Transactions on Graphics, vol. 36, No. 4.

Jeschke, Stefan, et al., Water Surface Wavelets, Aug. 2018, pp. 1-13, ACM Transactions on Graphics, vol. 37, No. 4.

Chinese-language Office Action issued in Chinese Application No. 202111419447.9 dated Mar. 25, 2025 with English translation (23 pages).

* cited by examiner

Water surface 15-1

Water surface 16-1

Water surface 17-1

Water surface 18-1

VIRTUAL SCENE-BASED RENDERING METHOD AND APPARATUS, ELECTRONIC DEVICE, COMPUTER-READABLE STORAGE MEDIUM, AND COMPUTER PROGRAM PRODUCT

RELATED APPLICATION

This application is a continuation of International Patent Application No. PCT/CN2022/119278, filed Sep. 16, 2022, which claims priority to Chinese Patent Application No. 202111419447.9, filed Nov. 26, 2021. The contents of International Patent Application No. PCT/CN2022/119278 and Chinese Patent Application No. 202111419447.9 are each incorporated herein by reference in their entirety.

FIELD OF THE TECHNOLOGY

This application relates to rendering techniques in the field of computer application, and in particular to a virtual scene-based rendering method and apparatus, an electronic device, a computer-readable storage medium, and a computer program product.

BACKGROUND OF THE DISCLOSURE

In a virtual scene, there is often a need to render liquid surfaces, such as ocean surfaces and water surfaces, and virtual objects interacting with the liquid surfaces. In general, to achieve rendering of the liquid surface, and the virtual object interacting with the liquid surface, fluctuation data of the liquid surface is typically resolved by a graphics processing unit (GPU) to render a high-confidence liquid surface, and the fluctuation data in the GPU is read back to render the virtual object interacting with the liquid surface. However, in the above-mentioned rendering process, there are performance fluctuations during reading back the GPU data, which affects the stability of rendering performance.

SUMMARY

Embodiments of this application provide a virtual scene-based rendering method and apparatus, an electronic device, a computer-readable storage medium, and a computer program product, which can improve the stability of rendering performance.

Technical solutions in the embodiments of this application are implemented as follows:

Embodiments of this application provide a virtual scene-based rendering method, including:
  resolving, by a graphics processing unit (GPU), vertex fluctuation data corresponding to each vertex to be rendered in a model to be rendered to obtain a vertex fluctuation data set corresponding to the model to be rendered;
  dividing, by a central processing unit (CPU), the model to be rendered into a plurality of grids to be rendered, and resolving grid fluctuation data corresponding to each of the grids to be rendered to obtain a grid fluctuation data set corresponding to the plurality of grids to be rendered;
  rendering, by the GPU, a liquid surface to be rendered in a virtual scene based on the vertex fluctuation data set; and
  rendering, by the CPU, a virtual object interacting with the liquid surface to be rendered based on the grid fluctuation data set.

Embodiments of this application provide a virtual scene-based rendering apparatus, including:
  a first resolving module, configured to call a graphics processing unit (GPU) to perform the following processing: resolving vertex fluctuation data corresponding to each vertex to be rendered in a model to be rendered to obtain a vertex fluctuation data set corresponding to the model to be rendered;
  a second resolving module, configured to call a central processing unit (CPU) to perform the following processing: dividing the model to be rendered into a plurality of grids to be rendered, and resolving grid fluctuation data corresponding to each of the grids to be rendered to obtain a grid fluctuation data set corresponding to the plurality of grids to be rendered; and
  a data rendering module, configured to call the GPU to perform the following processing: rendering a liquid surface to be rendered in a virtual scene based on the vertex fluctuation data set, and call the CPU to perform the following processing: rendering a virtual object for interacting with the liquid surface to be rendered based on the grid fluctuation data set.

Embodiments of this application provide an electronic device for rendering based on a liquid surface, including:
  a memory, configured to store a computer-executable instruction; and
  a processor including a graphics processing unit (GPU) and a central processing unit (CPU), the processor configured to implement, when executing the computer-executable instruction stored in the memory, the virtual scene-based rendering method provided by embodiments of this application.

Embodiments of this application provide a computer-readable storage medium storing a computer-executable instruction, the computer-executable instruction, when executed by a processor, implementing the virtual scene-based rendering method provided by embodiments of this application.

Embodiments of this application provide a computer program product including a computer program or a computer-executable instruction, the computer program or the computer executable instruction, when executed by a processor, implementing the virtual scene-based rendering method provided by embodiments of this application.

Embodiments of this application have at least the following beneficial effects: since the rendering of the liquid surface to be rendered implemented by the GPU is implemented based on data resolved by the GPU (referred to as the vertex fluctuation data set), and the rendering of the virtual object interacting with the liquid surface to be rendered implemented by the CPU is implemented based on data resolved by the CPU (referred to as the grid fluctuation data set); that is to say, each of the CPU and the GPU can implement the content to be rendered according to the data resolved by itself, so that a resource consumption of the interaction between the CPU and the GPU can be reduced, and thus the stability of rendering performance can be improved.

DESCRIPTION OF EMBODIMENTS

Figure 1:
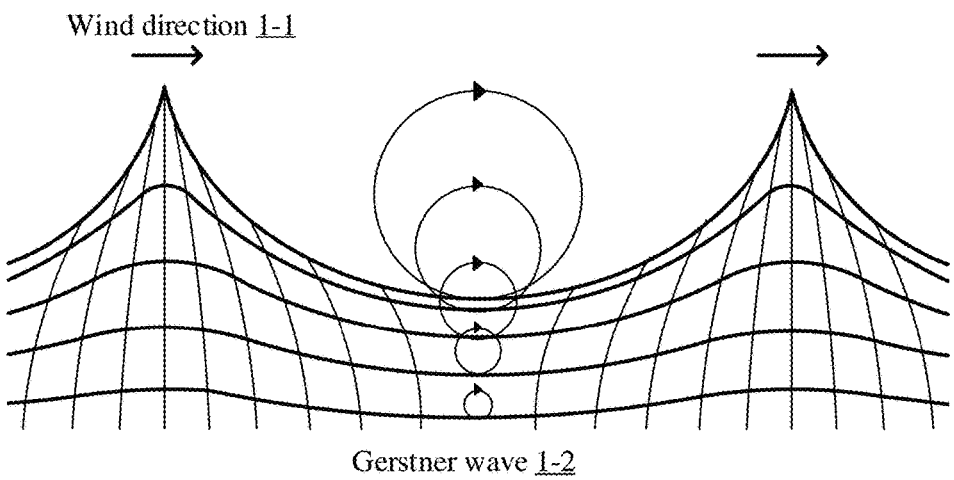
FIG. 1 is a waveform diagram of an exemplary Gerstner wave.

To make the objectives, technical solutions, and advantages of this application clearer, the following describes this application in further detail with reference to the accompanying drawings. The described embodiments are not to be considered as a limitation to this application. All other embodiments obtained by a person skilled in the art without creative efforts shall fall within the protection scope of this application.

In the following description, the term "some embodiments" is involved, which describes subsets of all possible embodiments, but it may be understood that "some embodiments" may be the same subset or different subsets of all the possible embodiments, and may be combined with each other without conflict.

In the following description, the terms "first" and "second" merely distinguish between similar objects and do not denote a particular ordering of the objects, and it may be understood that the terms "first" and "second" may be interchanged either in a particular order or in a sequential order, as permitted, to enable embodiments of this application described herein to be implemented otherwise than as specifically illustrated or described herein.

Unless otherwise defined, meanings of all technical and scientific terms used in this specification are the same as those usually understood by a person skilled in the art to which this application belongs. The terms used in embodiments of this application are for the purpose of describing embodiments of this application only and are not intended to limit this application.

Before embodiments of this application are further described in detail, a description is made on nouns and terms in embodiments of this application, and the nouns and terms in the embodiments of this application are applicable to the following explanations:

1) Fluid dynamics, which is a branch of fluid mechanics, is used for studying a motion law of a fluid as a continuous medium under an action of force and its interaction with a boundary, including an interaction of the fluid and other motion forms. The difference between fluid dynamics and fluid statics is that fluid dynamics studies the fluid in motion. The difference between fluid dynamics and fluid kinematics is that fluid dynamics is used for studying the force acting on the fluid. In addition, fluid dynamics includes two major parts, hydrodynamics and aerodynamics, and embodiments of this application involve hydrodynamics, describing ripples generated by a liquid surface under the action of force involved in liquid dynamics.

2) A ripple refers to a fluid mechanics effect of environmental forces, such as wind, on a water surface, including Gerstner wave (also referred to as Trochoidal wave). The essence of the Gerstner wave is an exact solution of Euler equations for periodic gravity waves on a liquid surface. A gravity wave refers to a wave in fluid mechanics within a liquid medium or between two medium interfaces (such as between the atmosphere and the ocean). When a clump of liquid leaves the liquid surface (two medium interface types) or reaches a region in the liquid with different liquid densities (liquid medium internal type), through gravity, the clump of liquid swings between equilibrium states in the form of fluctuation, forming the gravity wave. The Euler equation, i.e., differential equation of motion, is a fundamental equation in inviscid fluid dynamics and is the differential equation of motion obtained by applying Newton's second law to inviscid fluid micelles. In fluid dynamics, the Euler equation is a group of equations governing a motion of an inviscid fluid. In embodiments of this application, various fluctuation data involved are used for rendering ripples of the liquid surface.

3) CPU hyper-threading refers to the use of hardware instructions of special characters to simulate a plurality of logical cores into a physical chip, so that a single processor can use thread-level parallel computing, thereby compatible with multi-threaded parallel computing, and then compatible with multi-threaded operating systems and software to improve operating performance. In embodiments of this application, the resolving of fluctuation data performed by the CPU may be implemented using CPU hyper-threading.

4) A physics engine is configured to compute motion, rotation, and collision reflections by assigning true physical properties to rigid objects. In embodiments of this application, motion information of a virtual object interacting with a liquid surface may be determined by the physics engine.

5) A shader, an editable program for implementing image rendering in place of a fixed rendering pipeline, is editable so that various image rendering effects can be implemented without being limited by the fixed rendering pipeline of a graphics card. In embodiments of this application, the shader includes a compute shader and a fragment shader (also referred to as pixel shader). The compute shader is used for processing some computing work unrelated to rendering using resources of the shader, and in embodiments of this application, the compute shader is used for performing parallel processing on a large amount (greater than a first number threshold) of vertex data. The fragment shader is used for performing lighting computing for diffuse and/or specular reflections.

6) A rendering pipeline, such as a geometric pipeline, is configured to define computing methods and flows on the GPU.

7) A rasterization engine is configured to implement rasterization. Rasterization is a process of converting the vertex data into a fragment, and each element in the fragment may correspond to one pixel in a frame buffer so that rasterization is a process of converting a geometric primitive into a two-dimensional image.

8) A virtual scene refers to a scene outputted using a device and being different from the real world, and a visual perception of the virtual scene can be formed by the naked eye or the assistance of the device; for example, a two-dimensional image outputted by a display screen, a three-dimensional image outputted by stereoscopic display technologies such as stereoscopic projection, virtual reality, and augmented reality technology. In addition, various simulated real-world perceptions, such as auditory perception, tactile perception, olfactory perception, and motion perception, may also be formed by various possible hardware.

It should be further noted that, the virtual scene displayed (or provided) by an application when running on a terminal device may be a real-world simulation environment, a semi-simulation semi-fictional virtual environment, and a purely fictional virtual environment. The virtual scene may be any one of a two-dimensional virtual scene, a 2.5-dimensional virtual scene, or a three-dimensional virtual scene, and dimensions of the virtual scene are not limited in embodiments of this application. For example, the virtual scene may include a sky, a land, a sea, etc. the land may include environmental elements such as a desert, a city, and a building, and the virtual object may move or perform other operations (such as an attack operation) within the virtual scene under the control of a user or artificial intelligence (AI).

9) Virtual objects are images of various people and things that can interact in the virtual scene, or a movable object in the virtual scene. This movable object may be a virtual character, a virtual animal, an animation character, etc. such as a character, an animal, a plant, an oil bucket, a wall, a stone, and a building, displayed in the virtual scene. This virtual object may be a virtual image in this virtual scene for representing the user. The virtual scene may include a plurality of virtual objects, and each virtual object has its own shape and volume in the virtual scene and occupies some space in the virtual scene. In embodiments of this application, the virtual object involved is the virtual object interacting with the liquid surface to be rendered.

Figure 2:
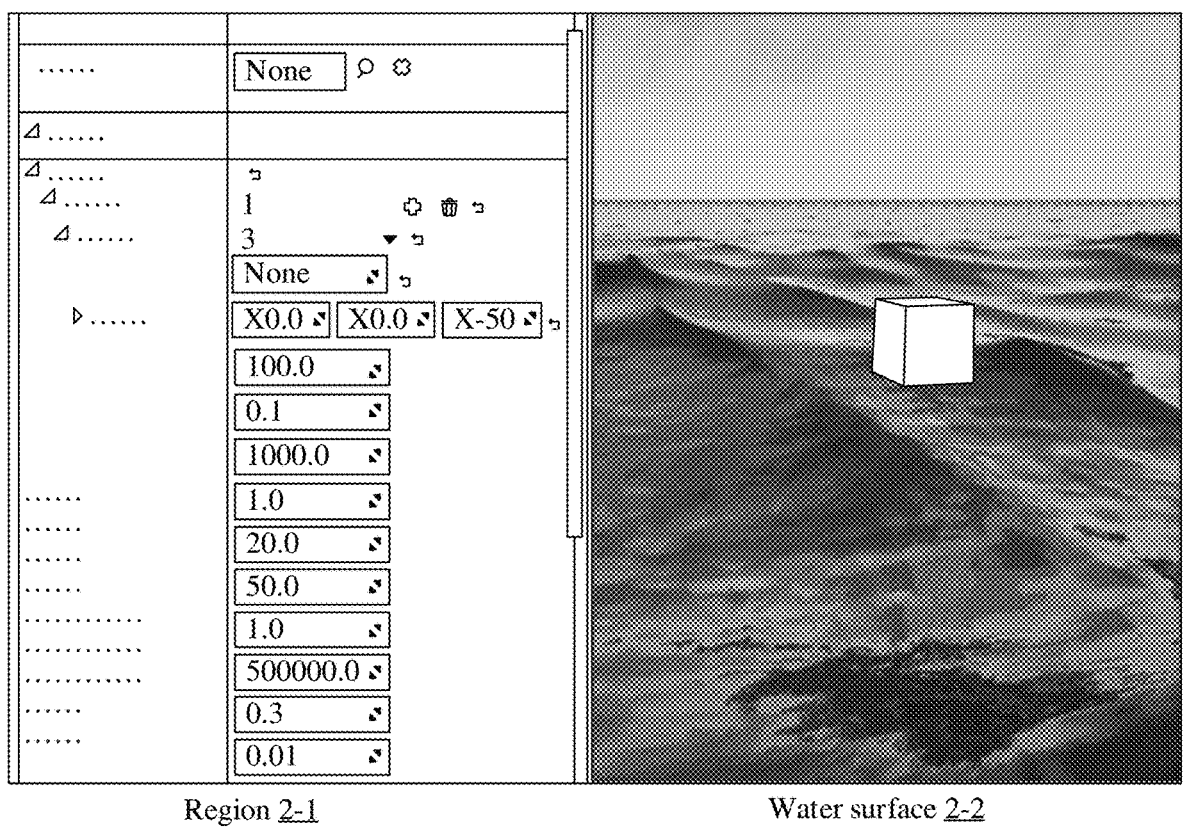
FIG. 2 is a rendering diagram of an exemplary Gerstner wave.

In general, in order to render ripples of the liquid surface, this is usually implemented by rendering the Gerstner wave. Referring to FIG. 1, FIG. 1 is a waveform diagram of an exemplary Gerstner wave. As shown in FIG. 1, a Gerstner wave 1-2 under an action of a wind direction 1-1 is rendered. The Gerstner wave is widely used because it takes up computing resources that can be scaled in the rendering process and has good rendering performance and real-time performance. However, since the Gerstner wave is rendered by scheduling a large amount (greater than a second number threshold) of threads, the Gerstner wave is typically rendered by the GPU. Referring to FIG. 2, FIG. 2 is a rendering diagram of an exemplary Gerstner wave. As shown in FIG. 2, a water surface 2-2 is rendered by rendering the Gerstner wave based on parameters set in a region 2-1.

However, when ripples such as the Gerstner wave, a fast Fourier transform (FFT) wave, and a wave simulated by a wavicle are rendered by the GPU to realize a rendering of the liquid surface, if a motion effect of the virtual object interacting with the liquid surface also needs to be rendered, the fluctuation data on the GPU chip needs to be transmitted to a memory through a GPU bus (GPU BUS) for the CPU to process, because a functional module (such as a buoyancy settlement module, the physics engine, etc.) for rendering the motion effect of the virtual object interacting with the liquid surface is implemented by the CPU. Such is a read-back process, and the read-back of data per frame will result in performance fluctuations on the order of milliseconds (e.g., 5 milliseconds). Therefore, the rendering of the liquid surface and the virtual object interacting with the liquid surface is implemented by rendering ripples such as Gerstner waves by the GPU, influencing the stability of the rendering.

In addition, when the rendering of the liquid surface is implemented by rendering ripples such as Gerstner waves by the GPU, the CPU is often in an idle state to wait for the processing of the GPU, thus causing a waste of CPU resources.

Based on this, embodiments of this application provide a virtual scene-based rendering method and apparatus, an electronic device, a computer-readable storage medium, and a computer program product, which can improve rendering stability and resource utilization. Exemplary application of an electronic device for rendering based on the liquid surface (hereinafter simply referred to as a rendering device) provided by embodiments of this application is described below. The rendering device provided by embodiments of this application may be implemented as various types of terminals, such as a smart phone, a smart watch, a notebook computer, a tablet computer, a desktop computer, a smart television, a set-top box, a smart car device, a portable music player, a personal digital assistant, a dedicated messaging device, a portable game device, and a smart speaker, and may also be implemented as a server. In the following, exemplary application when the rendering device is implemented as the terminal will be described.

Figure 3:
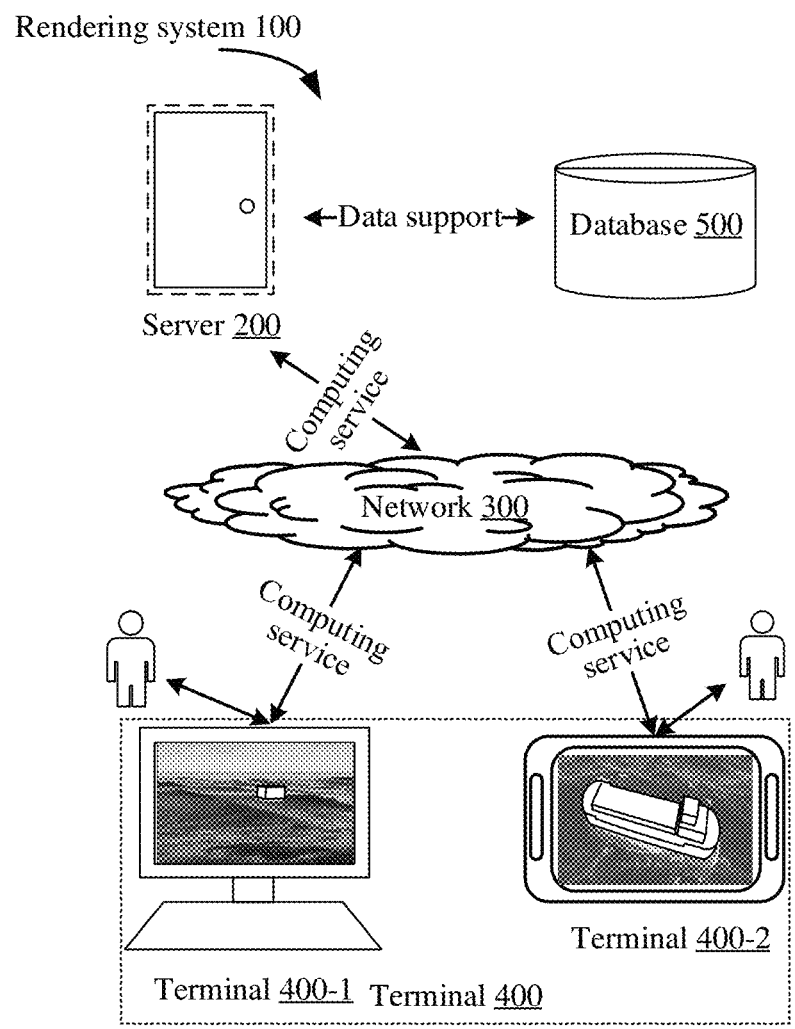
FIG. 3 is an architectural diagram of a virtual scene-based rendering system provided by an embodiment of this application.

Referring to FIG. 3, FIG. 3 is an architectural diagram of a virtual scene-based rendering system provided by an embodiment of this application. As shown in FIG. 3, in order to support one virtual scene-based rendering application, in the virtual scene-based rendering system 100, a terminal 400 (referred to as the rendering device, and a terminal 400-1 and a terminal 400-2 are exemplarily shown) is connected to a server 200 through a network 300. The network 300 may be a wide area network or a local area network, or a combination of both, and the server 200 is configured to provide computing services to the terminal 400. In addition, this virtual scene-based rendering system 100 also includes a database 500 for providing data support to the server 200. Also, a case where the database 500 is independent of the server 200 is shown in FIG. 3. Furthermore, the database 500 may be integrated in the server 200, and embodiments of this application do not limit this.

The terminal 400 is configured to resolve, by the GPU, vertex fluctuation data corresponding to each vertex to be rendered in a model to be rendered to obtain a vertex fluctuation data set corresponding to the model to be rendered; to divide, by the CPU, the model to be rendered into a plurality of grids to be rendered, and to resolve grid fluctuation data corresponding to each of the grids to be rendered to obtain a grid fluctuation data set corresponding to the plurality of grids to be rendered. In the virtual scene, a liquid surface to be rendered is rendered by the GPU based on the vertex fluctuation data set, and the virtual object interacting with the liquid surface to be rendered is rendered by the CPU based on the grid fluctuation data set (referring to the water surface and a tank floating on the water surface shown in the terminal 400-1, referring to the sea surface and a ship floating on the sea surface shown in the terminal 400-2).

In some embodiments, the server 200 may be an independent physical server, may be a server cluster or distributed system composed of a plurality of physical servers, and may also be a cloud server providing basic cloud computing services such as a cloud service, a cloud database, cloud computing, a cloud function, cloud storage, a network service, a cloud communication, a middleware service, a domain name service, a security service, a content delivery network (CDN), and a large data and artificial intelligence platform. The terminal 400 may be, but is not limited to, the smart phone, the smart watch, the notebook computer, the tablet computer, the desktop computer, the smart television, the set-top box, the smart car device, the portable music player, the personal digital assistant, the dedicated messaging device, the portable game device, and the smart speaker, etc. The terminal and the server may be directly or indirectly connected by wired or wireless communication, and are not limited in embodiments of this application.

It should be noted that, when the server 200 is a cloud game server, the server 200 may render the liquid surface to be rendered and the virtual object interacting with the liquid surface to be rendered, and transmit audio and video information characterizing a rendered liquid surface to be rendered and the virtual object interacting with the liquid surface to be rendered to the terminal 400 for playing.

Figure 4:
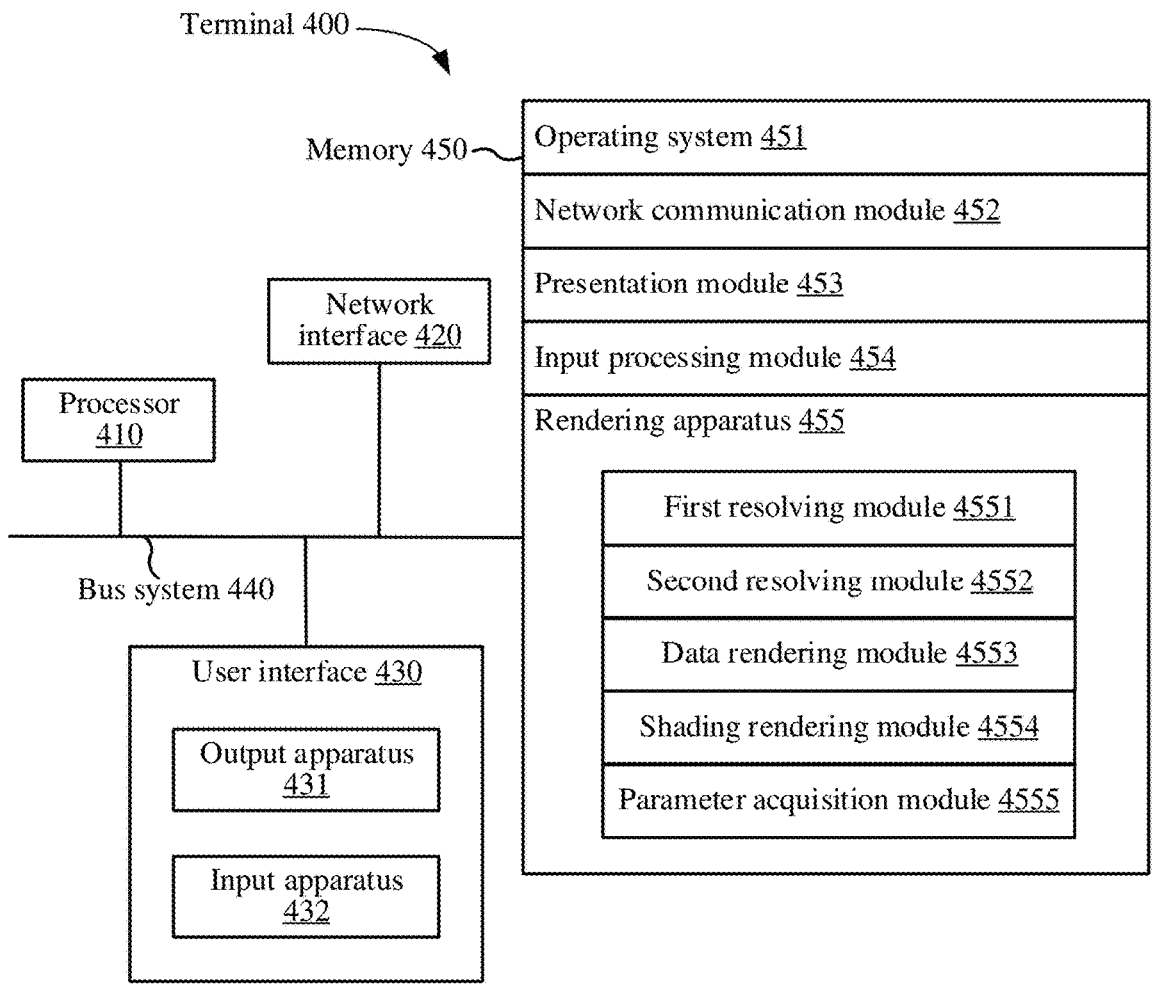
FIG. 4 is a structural diagram of the composition of a terminal in FIG. 3 provided by an embodiment of this application.

Referring to FIG. 4, FIG. 4 is a structural diagram of the composition of a terminal in FIG. 3 provided by an embodiment of this application, and the terminal 400 shown in FIG. 4 includes: at least one processor 410, a memory 450, at least one network interface 420, and a user interface 430. Various components in the terminal 400 are coupled together by a bus system 440. It may be understood that, the bus system 440 is configured to implement connection and communication between the components. In addition to a data bus, the bus system 440 also includes a power bus, a control bus, and a state signal bus. However, for ease of clear description, all types of buses in FIG. 4 are marked as the bus system 440.

The processor 410 may be an integrated circuit chip, such as a general purpose processor, a digital signal processor (DSP), or other programmable logic devices, discrete gate or transistor logic devices, discrete hardware components, etc. having a signal processing capability, where the general purpose processor may be a microprocessor or any conventional processor, etc.

The user interface 430 includes one or more output apparatus 431 that enable the presentation of media content, including one or more speakers and/or one or more visual display screens. The user interface 430 also includes one or more input apparatus 432, including user interface elements that facilitate user input, such as a keyboard, a mouse, a microphone, a touch display screen, a camera, other input buttons, and controls.

The memory 450 may be removable, non-removable, or a combination thereof. An exemplary hardware device includes a solid-state memory, a hard disk drive, an optical disc drive, etc. The memory 450 optionally includes one or more storage devices physically located away from the processor 410.

The memory 450 includes either a volatile memory or a nonvolatile memory, and may also include both the volatile memory and the nonvolatile memory. The nonvolatile memory may be a read only memory (ROM), and the volatile memory may be a random access memory (RAM). The memory 450 described in embodiments of this application is intended to include any suitable type of memory.

In some embodiments, the memory 450 can store data to support various operations, and examples of these data include programs, modules, and data structures, or subsets or supersets thereof, as exemplified below.

An operating system 451 includes a system program for processing various basic system services and performing hardware-related tasks, such as a framework layer, a core library layer, a driver layer, etc. for implementing various basic businesses and processing hardware-based tasks.

A network communication module 452 is configured to reach other electronic devices via one or more (wired or wireless) network interfaces 420, and an exemplary network interface 420 includes: Bluetooth, wireless fidelity (Wi-Fi), and a universal serial bus (USB), etc.

A presentation module 453 is configured to enable the presentation of information (e.g., a user interface configured to operate a peripheral device and display content and information) via one or more output apparatus 431 (e.g., the display screen, the speaker, etc.) associated with the user interface 430.

An input processing module 454 is configured to detect one or more user inputs or interactions from one of the one or more input apparatus 432 and translate detected inputs or interactions.

In some embodiments, a virtual scene-based rendering apparatus provided by embodiments of this application may be implemented in software, and FIG. 4 shows a rendering apparatus 455 stored in a memory 450, which may be software in the form of a program and a plug-in, etc.

including the following software modules: a first resolving module 4551, a second resolving module 4552, a data rendering module 4553, a shading rendering module 4554, and a parameter acquisition module 4555. These modules are logical, and therefore may be arbitrarily combined or further split according to the functions implemented. Functions of the various modules will be described below. The modules are in the form of software, programs and other software run by the CPU and the GPU.

In some embodiments, the rendering apparatus provided by embodiments of this application may be implemented in hardware, and as an example, the rendering apparatus provided by embodiments of this application may be a processor in the form of a hardware decoding processor, which is programmed to perform the virtual scene-based rendering method provided by embodiments of this application, for example, the processor in the form of the hardware decoding processor may adopt one or more application specific integrated circuit (ASIC), DSP, programmable logic device (PLD), complex programmable logic device (CPLD), field-programmable gate array (FPGA), or other electronic elements.

In some embodiments, the terminal or the server may implement the virtual scene-based rendering method provided by embodiments of this application by running a computer program. For example, the computer program may be a native program or the software module in the operating system; may be a native application (APP), i.e., a program which needs to be installed in the operating system to run, such as a video playing APP or a game application APP (including a local game application APP and a cloud game application APP); may be a mini program, i.e., a program which only needs to be downloaded into a browser environment to run; may also be a mini program which may be embedded into any APP. In general, the above-mentioned computer program may be any form of application, module, or plug-in.

Hereinafter, the virtual scene-based rendering method provided by embodiments of this application will be described in conjunction with exemplary application and implementation of the rendering apparatus provided by embodiments of this application. This virtual scene-based rendering method is performed by the rendering device, and the rendering device includes the CPU and the GPU. In addition, this rendering device may be one device including the CPU and the GPU simultaneously, may be a combination of a device including the CPU and a device including the GPU, or may also be a combination of the two, etc. and embodiments of this application do not limit this. For example, the CPU and the GPU are provided in a mobile phone or a desktop computer simultaneously; for another example, the desktop computer is externally connected to one or more GPUs through an expansion interface (an ExpressCard interface) or a board card (a mini-PCIe interface), and a built-in and an externally connected GPU are simultaneously used; for yet another example, the CPU is provided in the desktop computer, the GPU is not provided, and one or more GPUs are externally connected by the ExpressCard interface or the mini-PCIe interface; so on.

Figure 5:
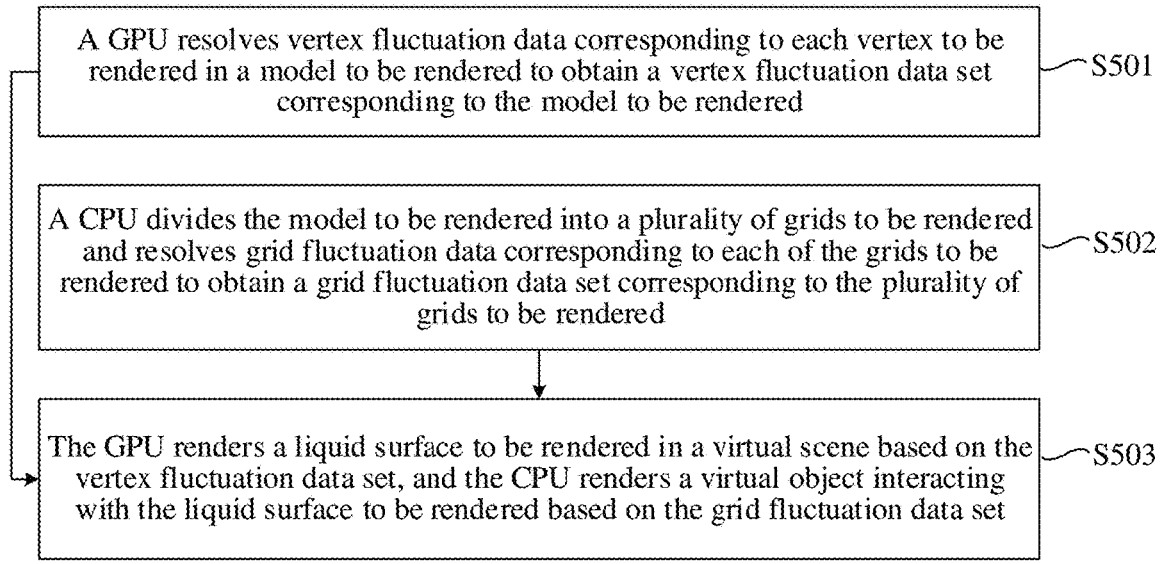
FIG. 5 is a flow diagram of a virtual scene-based rendering method provided by an embodiment of this application.

Referring to FIG. 5, FIG. 5 is a flow diagram of a virtual scene-based rendering method provided by an embodiment of this application, which will be described in conjunction with the steps shown in FIG. 5.

S501. The GPU resolves the vertex fluctuation data corresponding to each vertex to be rendered in the model to be rendered to obtain the vertex fluctuation data set corresponding to the model to be rendered.

In embodiments of this application, the rendering device, when rendering the liquid surface to be rendered and the virtual object interacting with the liquid surface to be rendered, is implemented by parallel processing of the CPU and the GPU. In the parallel processing of the CPU and the GPU, the GPU is configured to resolve fluctuation data of a fine granularity corresponding to the model to be rendered, which is referred to as herein as the vertex fluctuation data set, and this vertex fluctuation data set is used for rendering ripples of the liquid surface to be rendered.

Here, when rendering the liquid surface to be rendered and the virtual object interacting with the liquid surface to be rendered, the rendering device calls the GPU so that the GPU resolves fluctuation data of the model to be rendered in units of the vertex to be rendered. When resolving the fluctuation data corresponding to each vertex to be rendered (referred to as the vertex fluctuation data), the rendering device combines the vertex fluctuation data corresponding to each vertex to be rendered in the model to be rendered, and the vertex fluctuation data set corresponding to the model to be rendered is obtained.

The liquid surface to be rendered is a surface of a liquid to be rendered, such as a surface of the water (a surface of the sea, a surface of a lake), a surface of other solutions. The model to be rendered is a model for rendering the liquid surface to be rendered and may be a three-dimensional structure model or a two-dimensional structure model, etc. and embodiments of this application do not limit this. The virtual object interacting with the liquid surface to be rendered may be a virtual object carried by the liquid surface to be rendered, such as the ship, a floating person or object. In addition, the model to be rendered is composed of a mesh, and the mesh is composed of a polygon, and vertices of the polygon are vertices to be rendered so that the model to be rendered includes a plurality of vertices to be rendered. Furthermore, the vertex fluctuation data is fluctuation data of the vertex to be rendered. The vertex fluctuation data set is fluctuation data of the fine granularity (referred to as a granularity of the vertex to be rendered) of the liquid surface to be rendered, and the vertex fluctuation data set is a set composed of a plurality of vertex fluctuation data corresponding to a plurality of vertices to be rendered one by one.

S502. The CPU divides the model to be rendered into a plurality of grids to be rendered and resolves the grid fluctuation data corresponding to each of the grids to be rendered to obtain the grid fluctuation data set corresponding to the plurality of grids to be rendered.

In embodiments of this application, during the parallel rendering of the CPU and the GPU of the rendering device, the CPU is configured to resolve fluctuation data of a coarse granularity (referred to as a granularity of the grid to be rendered) corresponding to the model to be rendered, which is referred to as herein as the grid fluctuation data set. This grid fluctuation data set is used for determining motion information of the virtual object interacting with the liquid surface to be rendered, and then rendering the virtual object interacting with the liquid surface to be rendered based on the motion information.

Here, when rendering the liquid surface to be rendered and the virtual object interacting with the liquid surface to be rendered, the rendering device calls the GPU so that the GPU resolves the fluctuation data of the model to be rendered in units of the vertex to be rendered, and also calls the CPU so that the CPU divides the model to be rendered into a plurality of grids to be rendered, and then resolves the fluctuation data of the model to be rendered in units of the grid to be rendered. When resolving the fluctuation data corresponding to each grid to be rendered (referred to as the grid fluctuation data), the rendering device combines the grid fluctuation data corresponding to each grid to be rendered in the model to be rendered, and the grid fluctuation data set corresponding to the model to be rendered is obtained.

The grid to be rendered is obtained by dividing a region of the model to be rendered and is a region of a specified size, and the granularity of the grid to be rendered is greater than that of the vertex to be rendered. For example, the grid to be rendered includes at least two vertices to be rendered. In addition, the grid fluctuation data are fluctuation data of the grid to be rendered. The grid fluctuation data set is fluctuation data of the coarse granularity (the granularity of the grid to be rendered) of the model to be rendered, and the grid fluctuation data set is a set composed of a plurality of grid fluctuation data corresponding to a plurality of grids to be rendered one by one. Accordingly, a resolving granularity of the GPU is finer than that of the CPU.

In some embodiments, S501 and S502 are performed in order. For example, S501 is performed first, and then S502 is performed after S501. In other embodiments, S501 and S502 are not performed in order of execution. For example, S501 and S502 are performed in parallel. That is to say, an execution of S501 is performed during an execution of S502, i.e., in the process of the CPU acquiring the grid fluctuation data set. The execution of S502 is performed during the execution of S501, i.e., in the process of the GPU acquiring the vertex fluctuation data set. Accordingly, in S502, the rendering device divides, by the CPU, the model to be rendered into a plurality of grids to be rendered and resolves the grid fluctuation data corresponding to each of the grids to be rendered to obtain the grid fluctuation data set corresponding to the plurality of grids to be rendered, including: in the process of the GPU acquiring the vertex fluctuation data set, the rendering device divides, by the CPU, the model to be rendered into the plurality of grids to be rendered and resolves the grid fluctuation data corresponding to each of the grids to be rendered to obtain the grid fluctuation data set corresponding to the plurality of grids to be rendered.

S503. The GPU renders the liquid surface to be rendered in the virtual scene based on the vertex fluctuation data set, and the CPU renders the virtual object interacting with the liquid surface to be rendered based on the grid fluctuation data set.

In embodiments of this application, after the GPU of the rendering device obtains the vertex fluctuation data set for rendering the ripples of the liquid surface to be rendered, the GPU renders the ripples of the liquid surface to be rendered based on the vertex fluctuation data set, and thus rendering the liquid surface to be rendered in the virtual scene is realized. And after the CPU of the rendering device obtains the grid fluctuation data set for rendering a posture of the virtual object interacting with the liquid surface to be rendered, the CPU renders the posture of the virtual object interacting with the liquid surface to be rendered based on the grid fluctuation data set, and thus rendering the virtual object interacting with the liquid surface to be rendered in the virtual scene is realized.

The rendering of the liquid surface to be rendered is performed by the GPU and the rendering of the virtual object interacting with the liquid surface to be rendered is performed by the CPU.

It is to be understood that in the process of resolving the fluctuation data of the liquid surface to be rendered (referred to as the vertex fluctuation data set) by the GPU, simultaneously resolving of the coarse granularity is performed on the fluctuation data of the liquid surface to be rendered by the CPU. Accordingly, while the GPU realizes accurate rendering of the liquid surface to be rendered, the CPU can render the virtual object interacting with the liquid surface to be rendered based on fluctuation data of the coarse granularity (referred to as the grid fluctuation data set) resolved by the CPU. Thus, since the rendering of the liquid surface to be rendered implemented by the GPU is implemented based on data resolved by the GPU, and the rendering of the virtual object interacting with the liquid surface to be rendered implemented by the CPU is implemented based on data resolved by the CPU; that is to say, each of the CPU and the GPU can implement the content to be rendered according to the data resolved by itself, so that a resource consumption of the interaction between the CPU and the GPU can be reduced, and thus the stability of rendering performance can be improved. In addition, while the GPU resolves the fluctuation data for rendering the ripples of the liquid surface to be rendered, the CPU resolves the fluctuation data for rendering the posture of the virtual object interacting with the liquid surface to be rendered, thereby enabling parallel rendering of the liquid surface to be rendered and the virtual object interacting with the liquid surface to be rendered, improving resource utilization.

Figure 6A:
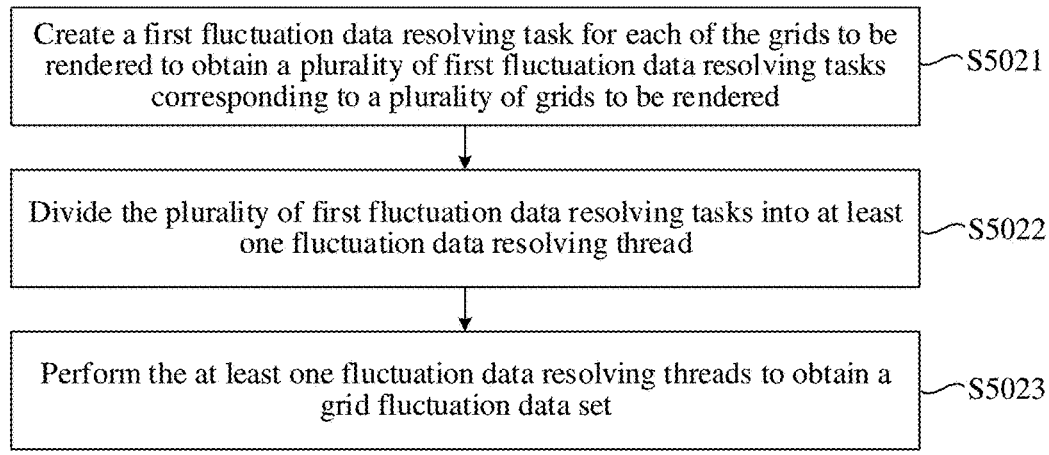
FIG. 6a is a flow diagram of acquiring a grid fluctuation data set provided by an embodiment of this application.

Referring to FIG. 6a, FIG. 6a is a flow diagram of acquiring a grid fluctuation data set provided by an embodiment of this application. As shown in FIG. 6a, in embodiments of this application, in S502, the CPU in the rendering device resolves the grid fluctuation data corresponding to each grid to be rendered to obtain the grid fluctuation data set corresponding to a plurality of grids to be rendered, including S5021 to S5023, and each step is respectively described below.

S5021. Create a first fluctuation data resolving task for each of the grids to be rendered to obtain a plurality of first fluctuation data resolving tasks corresponding to the plurality of grids to be rendered.

In embodiments of this application, the CPU may resolve each of the grid fluctuation data corresponding to each of the grids to be rendered either discretely or in parallel. Here, when the CPU is multi-core, hyper-threading may be realized, and at this time, the CPU may obtain the grid fluctuation data set through the parallel processing.

The CPU creates one task for resolving corresponding grid fluctuation data for each of the grids to be rendered, that is to say, the first fluctuation data resolving task is also created. Accordingly, for the plurality of grids to be rendered, the plurality of first fluctuation data resolving tasks are also created. The first fluctuation data resolving task is used for resolving the grid fluctuation data corresponding to each of the grids to be rendered, and the plurality of grids to be rendered correspond to the plurality of first fluctuation data resolving tasks one by one.

S5022. Divide the plurality of the first fluctuation data resolving tasks into at least one fluctuation data resolving thread.

In embodiments of this application, the CPU allocates a plurality of constructed first fluctuation data resolving tasks to at least one thread (referred to as at least one fluctuation data resolving thread). Here, one thread corresponds to one task queue, the fluctuation data resolving thread is one thread, and this fluctuation data resolving thread corresponds to a task queue composed of at least one first fluctuation data resolving task in the plurality of first fluctuation data resolving tasks. A number of the first fluctuation data resolving task in the plurality of first fluctuation data resolving tasks is greater than or equal to a number of the fluctuation data resolving thread in the at least one fluctuation data resolving thread.

S5023. Perform the at least one fluctuation data resolving thread to obtain the grid fluctuation data set.

In embodiments of this application, when the at least one fluctuation data resolving thread is the plurality of fluctuation data resolving threads, the CPU may perform the plurality of fluctuation data resolving threads in parallel, or may perform the plurality of fluctuation data resolving threads in series, or may be a combination of parallel and serial, etc., and embodiments of this application do not limit this.

A process of the CPU performing the plurality of fluctuation data resolving threads is a process of performing each first fluctuation data resolving task to resolve the grid fluctuation data corresponding to each of the grids to be rendered. Accordingly, when the CPU completes the execution of the plurality of fluctuation data resolving threads, the grid fluctuation data corresponding to each grid to be rendered in the liquid surface to be rendered is also obtained, and thus the grid fluctuation data set composed of the grid fluctuation data corresponding to each grid to be rendered in the model to be rendered is also obtained.

It is to be understood that through using the multi-core and hyper-threading processing of the CPU, the process of resolving the fluctuation data of the coarse granularity of the model to be rendered in the CPU is realized, thereby improving the stability and resource utilization of rendering the liquid surface.

Figure 6B:
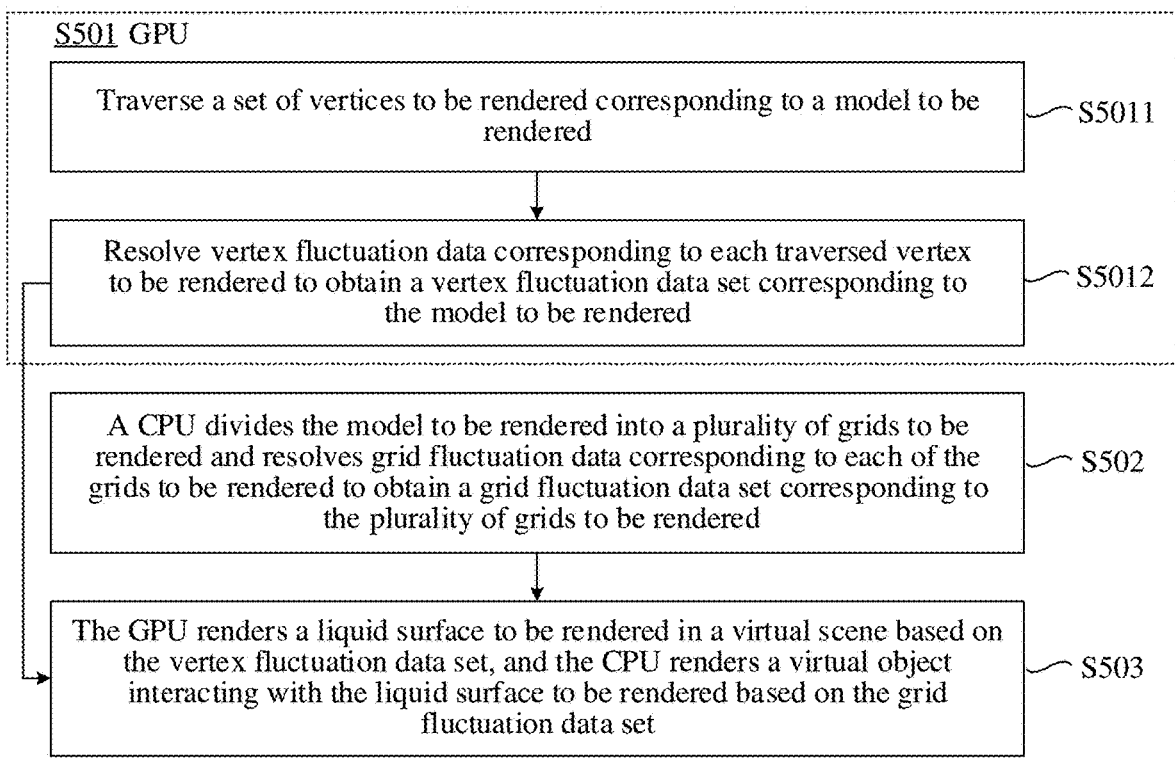
FIG. 6b is a flow diagram of a virtual scene-based rendering method provided by an embodiment of this application.

Referring to FIG. 6b, FIG. 6b is a flow diagram of a virtual scene-based rendering method provided by an embodiment of this application. As shown in FIG. 6b, in embodiments of this application, in S501, the GPU of the rendering device resolves the vertex fluctuation data corresponding to each vertex to be rendered in the model to be rendered to obtain the vertex fluctuation data set corresponding to the model to be rendered, including S5011 and S5012, and each step is respectively described below.

S5011. Traverse a set of vertices to be rendered corresponding to the model to be rendered.

The plurality of vertices to be rendered included in the model to be rendered is the set of vertices to be rendered. Here, the GPU traverses the plurality of vertices to be rendered in the set of vertices to be rendered to resolve the vertex fluctuation data of the vertices to be rendered one by one.

S5012. Resolve the vertex fluctuation data corresponding to each traversed vertex to be rendered to obtain the vertex fluctuation data set corresponding to the model to be rendered.

The GPU resolves the fluctuation data for each traversed vertex to be rendered, and the vertex fluctuation data corresponding to each vertex to be rendered in the model to be rendered is resolved, and thus the vertex fluctuation data set is obtained by combining the vertex fluctuation data corresponding to each vertex to be rendered in the model to be rendered.

In embodiments of this application, S5011 and S5012 may be implemented by the geometric pipeline (i.e., at least one of the fragment shaders and a vertex shader) in the GPU.

Figure 6C:
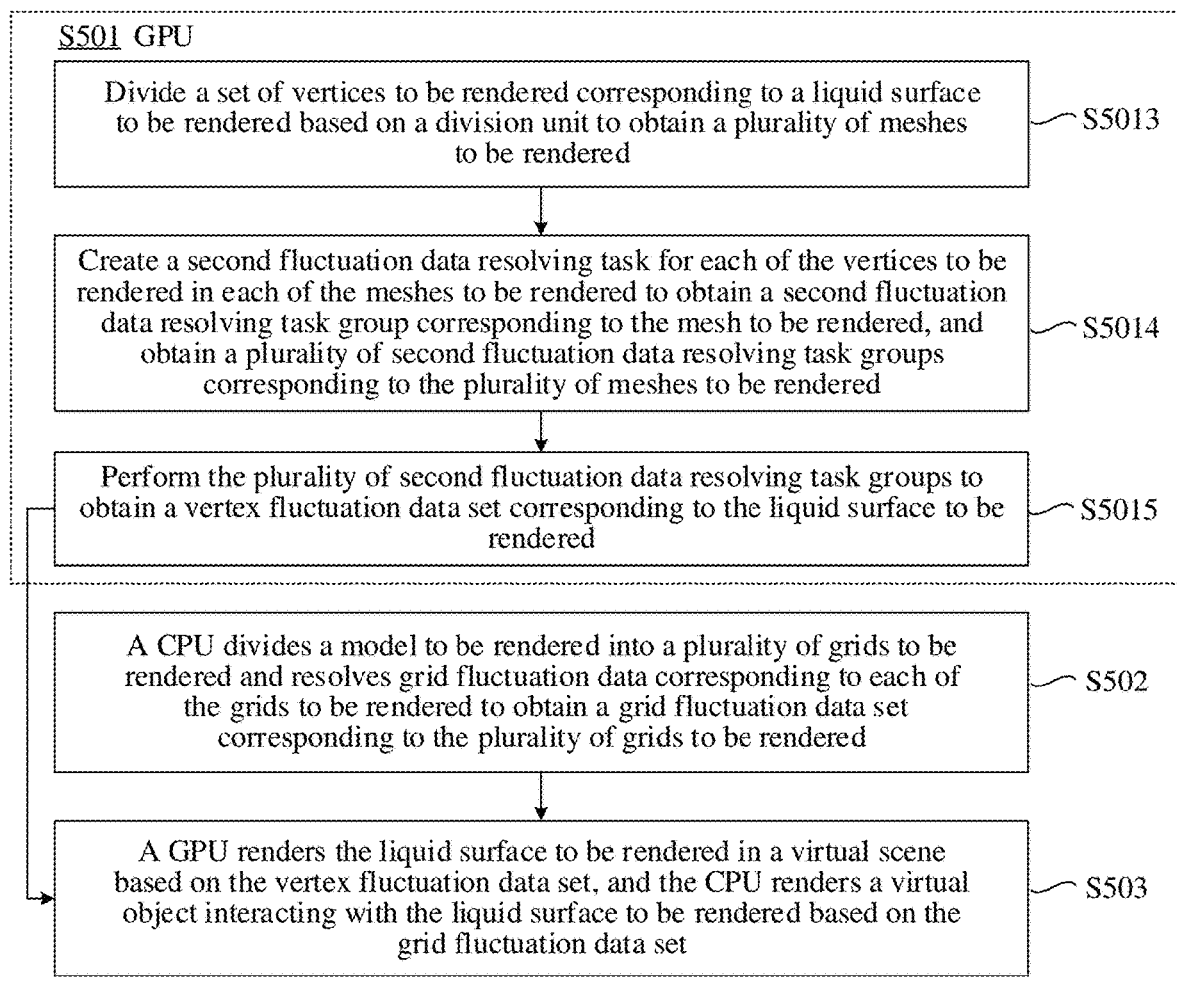
FIG. 6c is a flow diagram of a virtual scene-based rendering method provided by an embodiment of this application.

Referring to FIG. 6c, FIG. 6c is a flow diagram of a virtual scene-based rendering method provided by an embodiment of this application. As shown in FIG. 6c, in embodiments of this application, in S501, the GPU of the rendering device resolves the vertex fluctuation data corresponding to each vertex to be rendered in the model to be rendered to obtain the vertex fluctuation data set corresponding to the model to be rendered, including S5013 and S5015, and each step is respectively described below.

S5013. Divide the set of vertices to be rendered corresponding to the liquid surface to be rendered based on a division unit to obtain a plurality of meshes to be rendered.

In embodiments of this application, the GPU may divide the model to be rendered into the plurality of meshes to be rendered, where the division unit includes a specified number of vertices to be rendered, and thus each mesh to be rendered includes a specified number of vertices to be rendered. The mesh to be rendered differs from the grid to be rendered in that the mesh to be rendered is divided based on a number of vertices to be rendered, and the grid to be rendered is divided based on the region. And, the specified number is a number of threads in a thread bundle, such as, 32*32, 64*64.

S5014. Create a second fluctuation data resolving task for each of the vertices to be rendered in each of the meshes to be rendered to obtain a second fluctuation data resolving task group corresponding to the mesh to be rendered, and obtain a plurality of second fluctuation data resolving task groups corresponding to the plurality of meshes to be rendered.

In embodiments of this application, the GPU creates a task for resolving corresponding vertex fluctuation data for each of the vertices to be rendered, that is to say, the second fluctuation data resolving task is also created. Accordingly, for the specified number of vertices to be rendered which are included in the mesh to be rendered, a specified number of second fluctuation data resolving tasks are also created. Here, the specified number of second fluctuation data resolving tasks are grouped into the second fluctuation data resolving tasks group. Accordingly, for the plurality of meshes to be rendered, the plurality of second fluctuation data resolving tasks groups are also created. The second fluctuation data resolving task is used for resolving the vertex fluctuation data corresponding to each of the vertices to be rendered, and the plurality of meshes to be rendered correspond to the plurality of second fluctuation data resolving task groups one by one.

S5015. Perform the plurality of second fluctuation data resolving task groups to obtain the vertex fluctuation data set corresponding to the liquid surface to be rendered.

In embodiments of this application, the GPU may perform the plurality of second fluctuation data resolving task groups in parallel, or may perform the plurality of second fluctuation data resolving task groups in series, or may be a combination of parallel and serial, etc., and embodiments of this application do not limit this. Here, the GPU may correspond each of the second fluctuation data resolving task groups to one thread bundle, and perform each of the second fluctuation data resolving task groups by performing one thread bundle.

A process of the GPU performing the plurality of second fluctuation data resolving task groups is a process of performing each of the second fluctuation data resolving tasks to resolve the vertex fluctuation data corresponding to each of the vertices to be rendered. Accordingly, when the GPU completes performing the plurality of second fluctuation data resolving task groups, the vertex fluctuation data corresponding to each of the vertices to be rendered in the model to be rendered are also obtained, and thus the vertex fluctuation data set composed of the vertex fluctuation data corresponding to each of the vertices to be rendered in the model to be rendered is also obtained.

In embodiments of this application, S5013 and S5015 may be implemented by the compute shader in the GPU. In addition, the GPU of the rendering device may obtain the vertex fluctuation data set through S5011 and S5012 when the vertex fluctuation data set cannot be obtained through S5013 and S5015.

Through using the thread bundle processing of the GPU, the thread bundle is corresponding to the mesh to be rendered of a certain size (a specified number of vertices to be rendered), batch computing is realized, and thus lightweight thread scheduling (a number of threads is less than a specified number of threads) is realized, and the efficiency of resolving the fluctuation data of the fine granularity of the liquid surface to be rendered can be improved.

Figure 6D:
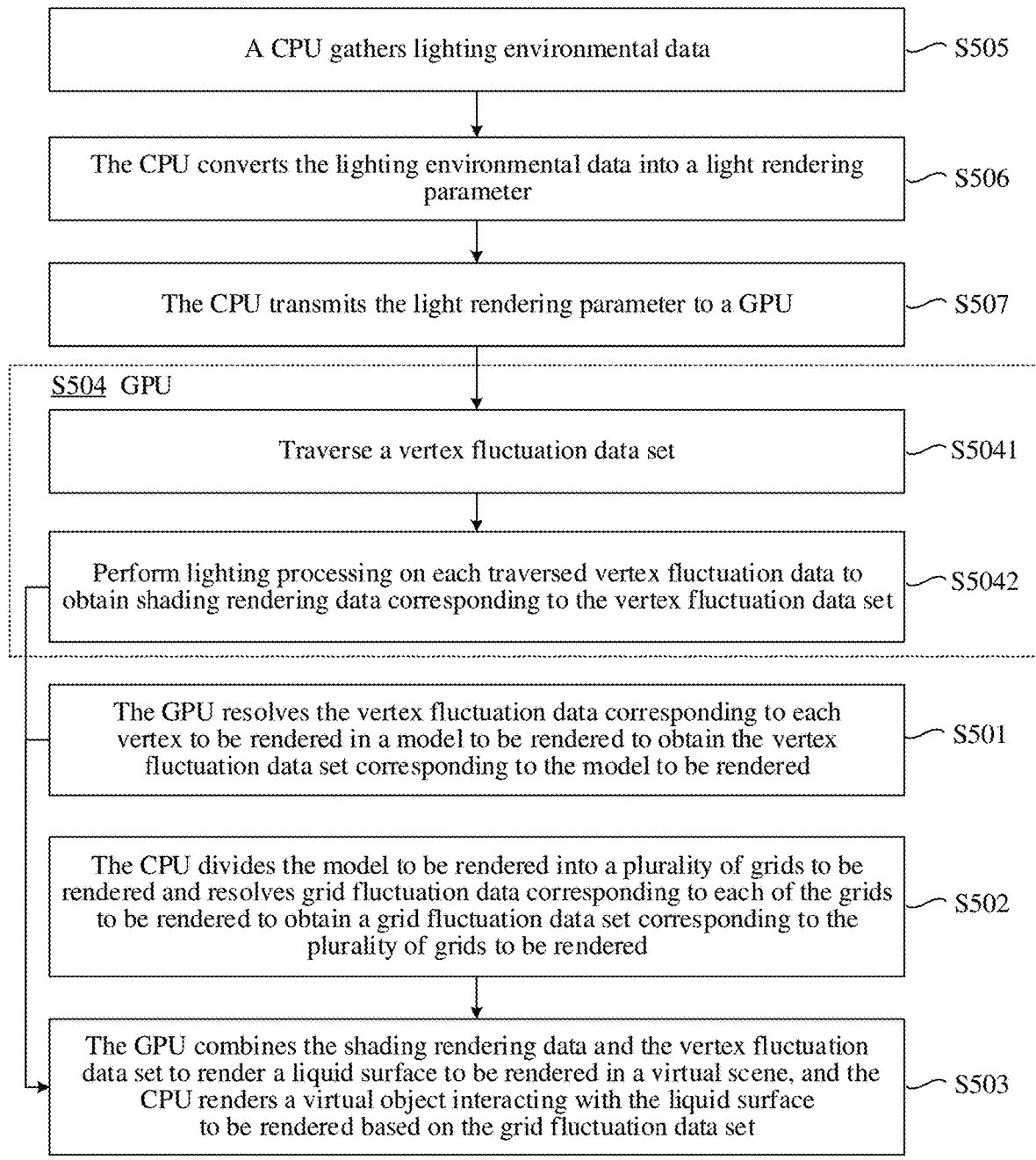
FIG. 6d is a flow diagram of a virtual scene-based rendering method provided by an embodiment of this application.

Referring to FIG. 6d, FIG. 6d is a flow diagram of a virtual scene-based rendering method provided by an embodiment of this application. As shown in FIG. 6d, in embodiments of this application, S501 is followed by S504. That is to say, after the GPU in the rendering device resolves the vertex fluctuation data corresponding to each of the vertices to be rendered of the liquid surface to be rendered to obtain the vertex fluctuation data set corresponding to the liquid surface to be rendered, this virtual scene-based rendering method also includes S504, and this step is described below.

S504. Determine, by the GPU, shading rendering data corresponding to the vertex fluctuation data set.

In addition to rendering the ripples of the liquid surface to be rendered, the rendering device also renders the shading effect of the liquid surface to be rendered. Accordingly, the GPU of the rendering device is also configured to determine the shading rendering data corresponding to the vertex fluctuation data set, where the shading rendering data is used for rendering the shading effect of the liquid surface to be rendered.

Accordingly, in embodiments of this application, in S503, the GPU renders the liquid surface to be rendered based on the vertex fluctuation data set, including: the GPU combines the shading rendering data and the vertex fluctuation data set to render the liquid surface to be rendered in the virtual scene. That is to say, the GPU renders the shading effect of the liquid surface to be rendered based on the shading rendering data, and renders the ripples of the liquid surface to be rendered based on the vertex fluctuation data set, thereby completing the rendering of the liquid surface to be rendered.

The GPU renders a process of light propagation in the liquid by acquiring the shading rendering data, so it can improve a confidence of liquid ripple color rendering. Furthermore, since the rendering of ripples of the liquid surface to be rendered and the rendering of postures of the virtual object interacting with the liquid surface to be rendered are realized by the parallel processing of the GPU and the CPU, a confidence of the rendering of the liquid surface to be rendered can be improved with stable performance.

With continued reference to FIG. 6d, in embodiments of this application, S504 is preceded by S505 to S507. That is to say, before the rendering device determines the shading rendering data corresponding to the vertex fluctuation data set through the GPU, this virtual scene-based rendering method also includes S505 to S507, and each step is respectively described below.

S505. The CPU gathers lighting environmental data.

A rendering module gathers data related to shading through the CPU, and then gathers the lighting environmental data. Here, the lighting environmental data includes at least one of scene environmental data, lighting intensity, lighting color, lighting angle, and lighting behavior data. The scene environmental data is, such as, sky environmental data or indoor environmental data of the virtual scene. The lighting behavior data is, such as, a state of the virtual object in the virtual scene.

S506. The CPU converts the lighting environmental data into a light rendering parameter.

The CPU pre-processes and pre-computes the gathered lighting environmental data to convert the lighting environmental data into data for realizing light rendering, and thus the light rendering parameter is obtained.

S507. The CPU transmits the light rendering parameter to the GPU.

In embodiments of this application, the CPU uploads the converted light rendering parameter to the GPU through a parameter uploader, and thus the process of transmitting the light rendering parameter to the GPU is completed.

Accordingly, in embodiments of this application, in S504, the GPU determines the shading rendering data corresponding to the vertex fluctuation data set, including: the GPU determines the shading rendering data corresponding to the vertex fluctuation data set based on the light rendering parameter. That is to say, when the CPU transmits the light rendering parameter to the GPU, the GPU receives the light rendering parameter, and the GPU determines data for rendering the shading of the liquid surface to be rendered based on the received light rendering parameter, and obtains the shading rendering data.

With continued reference to FIG. 6d, in embodiments of this application, S504 may be realized by S5041 and S5042. That is to say, the GPU determines the shading rendering data corresponding to the vertex fluctuation data set, including S5041 and S5042, and each step is respectively described below.

S5041. Traverse the vertex fluctuation data set.

In embodiments of this application, the GPU traverses a solved vertex fluctuation data set in units of the vertex fluctuation data corresponding to the vertex to be rendered.

S5042. Perform lighting processing on each traversed vertex fluctuation data to obtain the shading rendering data corresponding to the vertex fluctuation data set.

In embodiments of this application, when the GPU performs the lighting processing on each traversed vertex fluctuation data, it may be realized based on the received light rendering parameter transmitted by the CPU. Here, when the GPU completes the lighting processing on each vertex fluctuation data in the vertex fluctuation data set, the shading rendering data corresponding to the vertex fluctuation data set are also obtained. Here, the lighting processing includes at least one of under-surface scattering processing, subsurface scattering processing, and surface reflection processing. The under-subsurface light scattering process refers to light scattering process below the surface of the liquid surface to be rendered, and the surface reflection process refers to light reflection process on the surface of the liquid surface to be rendered.

The rendering device performs the lighting processing on the vertex fluctuation data of each of the vertices to be rendered through at least one of the under-surface scattering process, the subsurface scattering process, and the surface reflection process, realizes the rendering of a ripple color of the liquid surface to be rendered from energy conservation and geometrical optics, enhances the fidelity of the liquid surface to be rendered, and enhances the rendering effect of the liquid surface to be rendered.

Figure 6E:
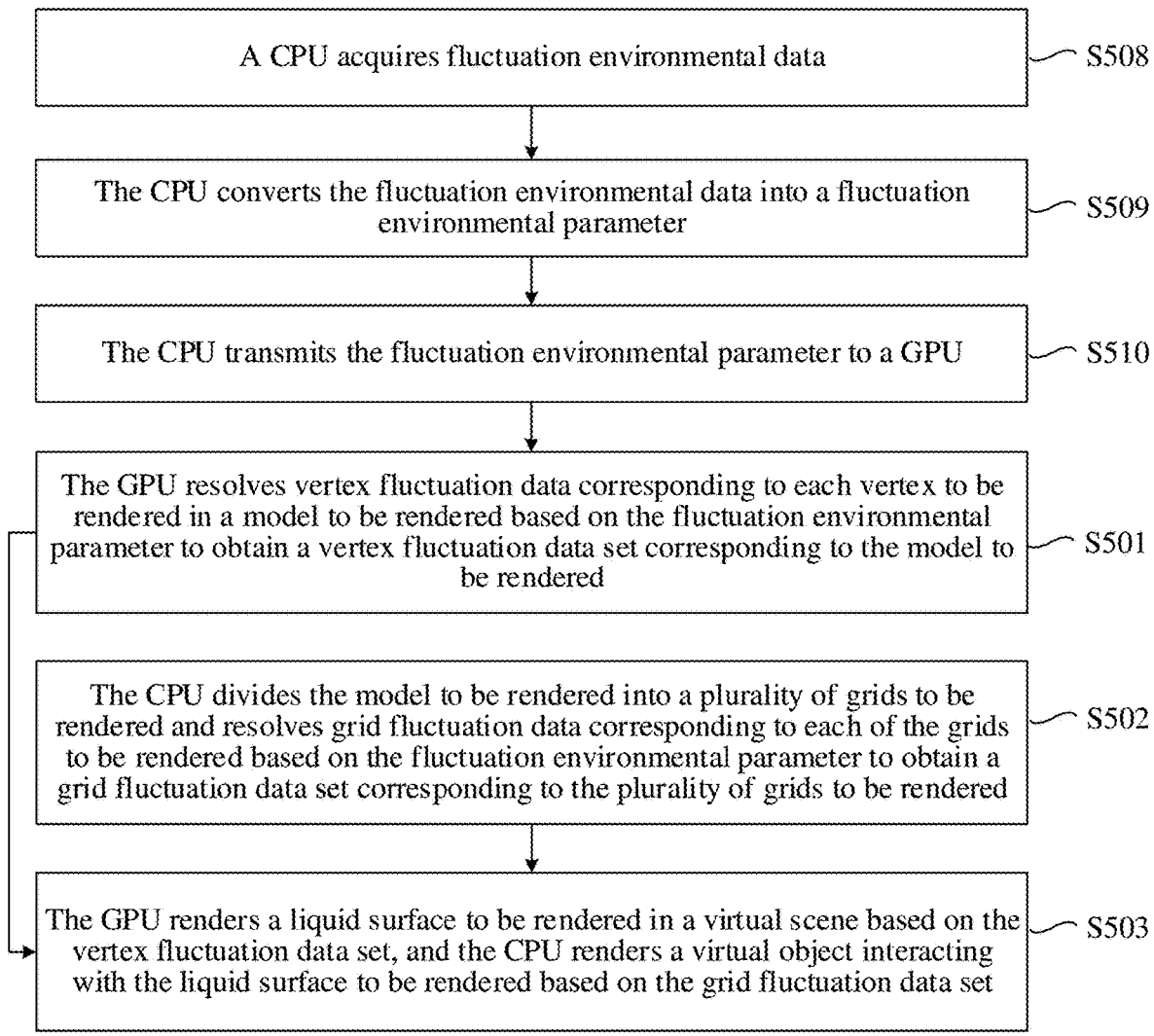
FIG. 6e is a flow diagram of a virtual scene-based rendering method provided by an embodiment of this application.

Referring to FIG. 6e, FIG. 6e is a flow diagram of a virtual scene-based rendering method provided by an embodiment of this application. As shown in FIG. 6e, in embodiments of this application, S501 is preceded by S508 to S510; That is to say, before the GPU of the rendering device resolves the vertex fluctuation data corresponding to each of the vertices to be rendered of the liquid surface to be rendered, the rendering method of the liquid surface also includes S508 to S510, and each step is respectively described below.

S508. The CPU acquires fluctuation environmental data.

The fluctuation environmental data refers to data affecting the ripples of the liquid surface to be rendered, including at least one of a wind direction, a wind power, a wave height, a wavelength, and fluctuation behavior data. The fluctuation behavior data is the behavior of the virtual object associated with the fluctuation of the liquid surface to be rendered in the virtual scene.

S509. The CPU converts the fluctuation environmental data into a fluctuation environmental parameter.

The CPU pre-processes and pre-computes the gathered fluctuation environmental data to convert the fluctuation environmental data into data for realizing ripple rendering, and thus the fluctuation environmental parameter is obtained.

S510. The CPU transmits the fluctuation environmental parameter to the GPU.

In embodiments of this application, the CPU uploads the converted fluctuation environmental parameter to the GPU through a parameter uploader, that is to say, transmitting the fluctuation environmental parameter to the GPU is completed. Here, when the CPU transmits the fluctuation environmental parameter to the GPU, the GPU receives the fluctuation environmental parameter.

In embodiments of this application, S508 to S510 are performed by the CPU in response to an $i^{th}$ frame rendering request of the liquid surface to be rendered in the virtual scene, where i is a monotonically increasing positive integer variable. That is to say, the virtual scene-based rendering method provided by embodiments of this application performs rendering of the liquid surface to be rendered and the virtual object interacting with the liquid surface to be rendered frame-by-frame, and can feed back the rendering parameter obtained in real time to a rendering result.

Accordingly, in embodiments of this application, in S501, the GPU of the rendering device resolves the vertex fluctuation data corresponding to each of the vertices to be rendered in the model to be rendered, including: the GPU resolves the vertex fluctuation data corresponding to each of the vertices to be rendered in the model to be rendered based on the fluctuation environmental parameter. And in S502, the CPU of the rendering device resolves the grid fluctuation data corresponding to each of the grids to be rendered, including: the CPU resolves the grid fluctuation data corresponding to each of the grids to be rendered based on the fluctuation environmental parameter.

During the rendering of the liquid surface to be rendered and the virtual object interacting with the liquid surface to be rendered, the CPU renders the liquid surface to be rendered and the virtual object interacting with the liquid surface to be rendered in the virtual scene in real-time in response to the rendering request of each frame, reducing the rendering delay and improving the rendering performance.

Figure 6F:
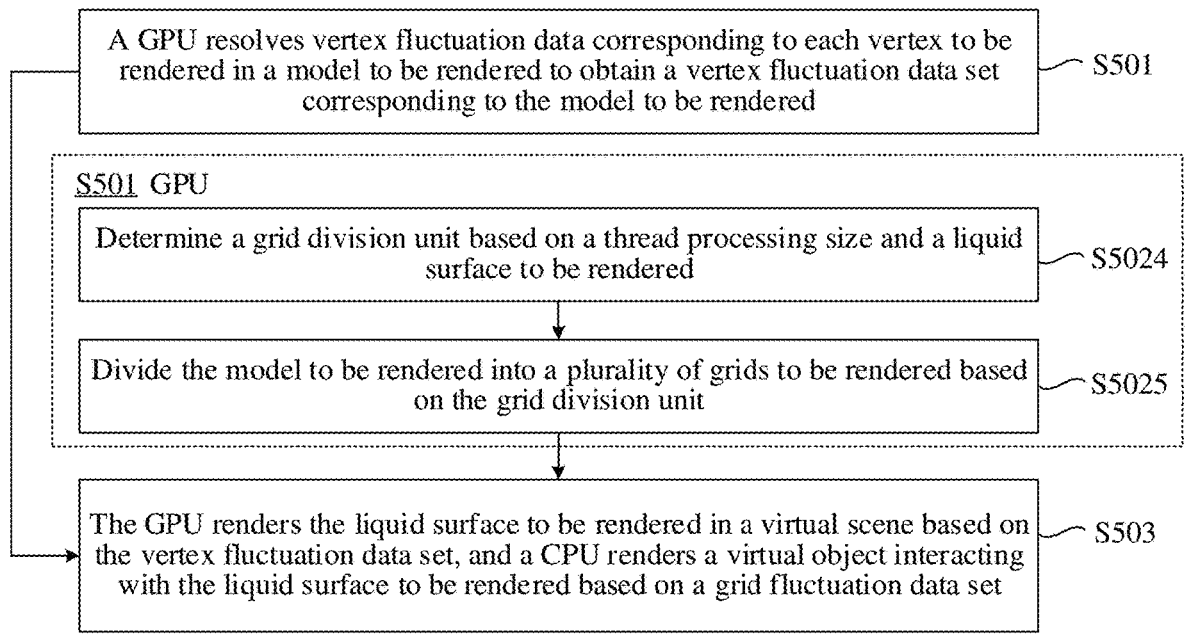
FIG. 6f is a flow diagram of a virtual scene-based rendering method provided by an embodiment of this application.

Referring to FIG. 6f, FIG. 6f is a flow diagram 6 of a virtual scene-based rendering method provided by an embodiment of this application. As shown in FIG. 6f, in embodiments of this application, in S502, the CPU of the rendering device divides the model to be rendered into the plurality of grids to be rendered, including S5024 and S5025, and each step is respectively described below.

S5024. Determine a grid division unit based on a thread processing size and the liquid surface to be rendered.

It should be noted that, the thread processing size is the maximum number of threads processed by the CPU, and the grid division unit is negatively correlated with the thread processing size, and is positively correlated with a size of the liquid surface to be rendered. Here, the grid division unit determined by the CPU is a size of each grid to be rendered.

S5025. Divide the model to be rendered into the plurality of grids to be rendered based on the grid division unit.

It should be noted that, a number of the grids to be rendered in the plurality of grids to be rendered divided by the CPU is positively correlated with the thread processing size.

It is to be understood that the CPU in the rendering device can maximize the use of the processing resources of the CPU by determining the grid division unit for dividing the model to be rendered based on the processing scale of the thread thereof, and improve the acquisition efficiency of the grid fluctuation data set, thereby improving the rendering efficiency.

Figure 6G:
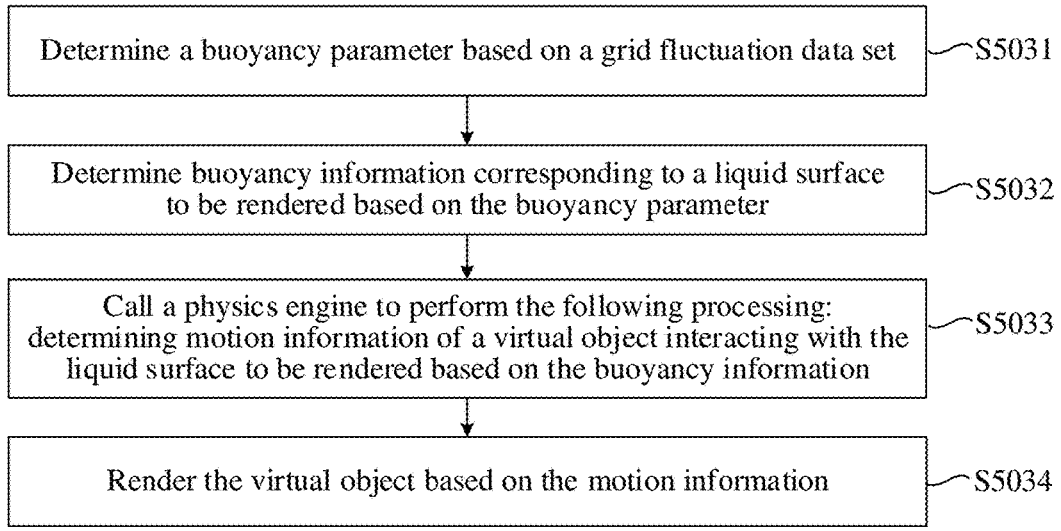
FIG. 6g is a flow diagram of rendering a virtual object provided by an embodiment of this application.

Referring to FIG. 6g, FIG. 6g is a flow diagram of rendering a virtual object provided by an embodiment of this application. As shown in FIG. 6g, in embodiments of this application, in S503, the CPU of the rendering device renders the virtual object interacting with the liquid surface to be rendered based on the grid fluctuation data set, including S5031 to S5034, and each step is respectively described below.

S5031. Determine a buoyancy parameter based on the grid fluctuation data set.

The CPU determines the buoyancy parameter, including parameters such as a displacement, for determining buoyancy of the liquid surface to be rendered.

S5032. Determine buoyancy information corresponding to the liquid surface to be rendered based on the buoyancy parameter.

S5033. Call the physics engine to perform the following processing: determining the motion information of the virtual object interacting with the liquid surface to be rendered based on the buoyancy information.

S5034. Render the virtual object based on the motion information.

In embodiments of this application, the CPU determines an acting force (such as the buoyancy information) of the interaction between the liquid surface to be rendered and the virtual object through a grid fluctuation data set resolved by itself, and then renders the state or posture of the virtual object interacting with the liquid surface to be rendered based on the acting force. The physics engine is called by the CPU.

In the following, exemplary application of embodiments of this application in one practical application scene will be described. The exemplary application describes a rendering method of a water surface (a water surface, referred to as the liquid surface to be rendered) in the field of water rendering, such as rendering of the water surface by a three dimension (3D) rendering module running in the game application on a client or a cloud server.

The rendering of the water surface includes water ripple simulation and ripple lighting shading. The water ripple simulation refers to the simulation of the ripples that occur when the water surface is affected by environmental forces such as a wind direction, a wind power, a wave height, and a wavelength, which generate the fluid mechanics effect. Here, water fluctuation data corresponding to the ripples generated by the water surface driven by the environmental forces are resolved simultaneously by the CPU and the GPU. The water is a complex medium, and the optical shading property is embodied by ripple lighting shading, where the ripple lighting shading refers to simulating a process of light propagating in the water to improve the confidence of a rendered water ripple color.

Figure 7:
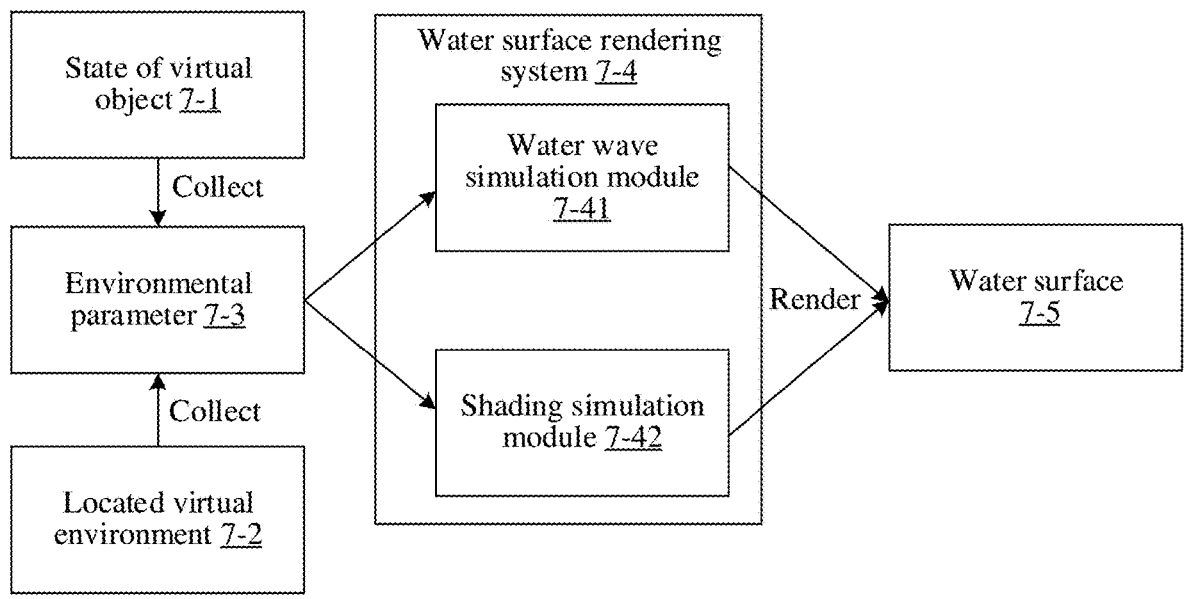
FIG. 7 is a flowchart of an exemplary rendering of a liquid surface provided by an embodiment of this application.

Referring to FIG. 7, FIG. 7 is a flowchart of an exemplary rendering of a liquid surface provided by an embodiment of this application. As shown in FIG. 7, firstly, environmental parameters 7-3 are collected from the state of the virtual object (referred to as a behavior of the virtual object in the virtual environment, for example, driving of a virtual ship) 7-1 and the virtual environment 7-2 where the virtual object is located. A water wave simulation module 7-41 and a shading simulation module 7-42 in a water surface rendering system 7-4 then jointly render a water surface 7-5 based on the environmental parameters 7-3. The water surface rendering system 7-4 is a functional module configured to realize the rendering of the water surface. The water wave simulation module 7-41 is configured to realize the simulation of water surface ripples by simulating the situation of water surface fluctuation, and the shading simulation module 7-42 is configured to realize the ripple lighting shading by simulating the shading effect of water surface ripples under a lighting environment. In addition, besides being influenced by environmental forces such as the wind direction, the wind power, the wave height, and the wavelength, the water ripple simulation may also be influenced by a behavior of the virtual object in the virtual environment. This is because the behavior of the virtual object in the virtual environment changes the environmental forces and thus affects a rendering result of the water surface, so the behavior of the virtual object in the virtual environment may affect the simulation of the water surface.

Figure 8:
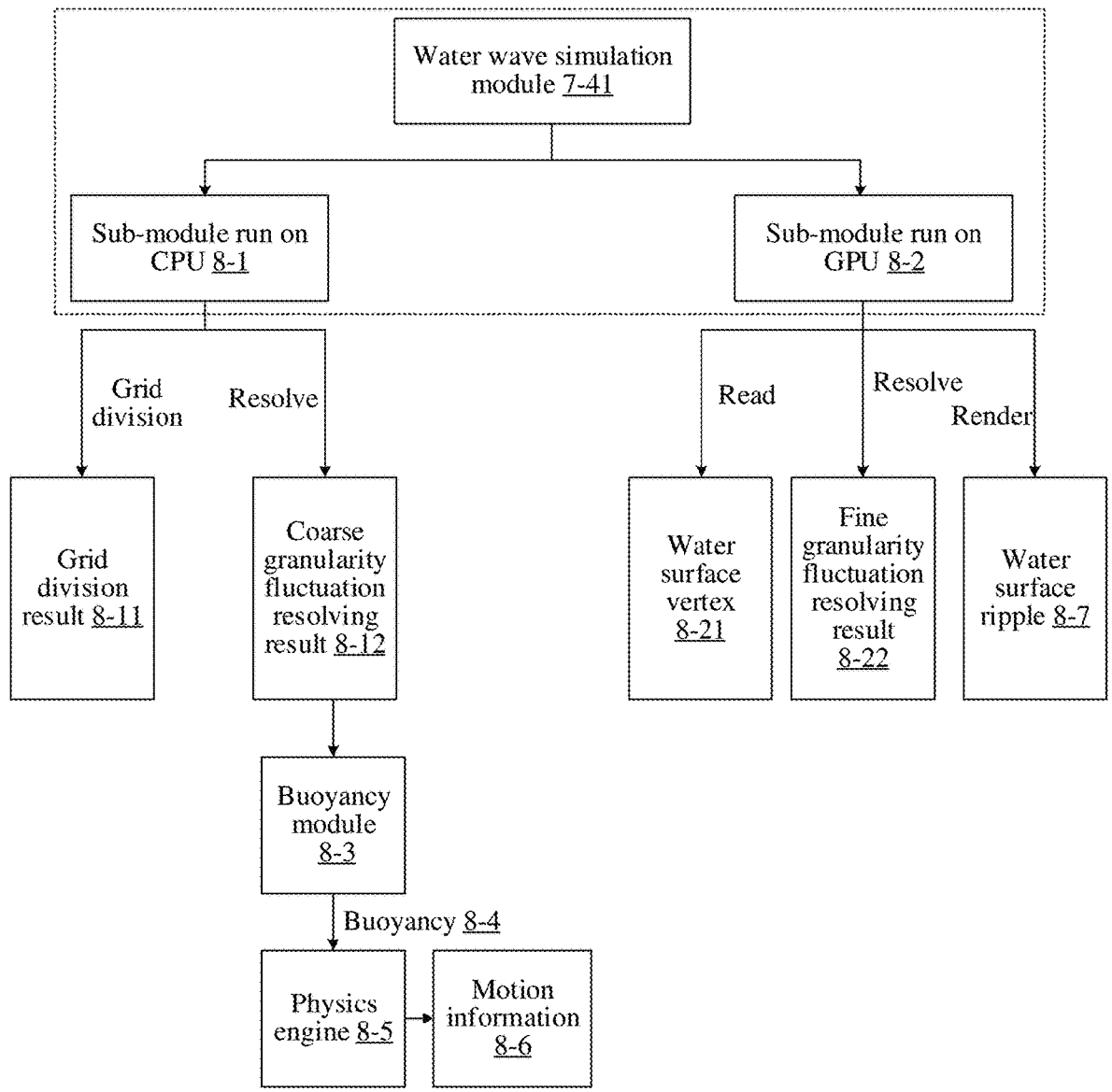
FIG. 8 is a functional implementation diagram of an exemplary water wave simulation module provided by an embodiment of this application.

In embodiments of this application, the water wave simulation module 7-41 in FIG. 7 includes a sub-module running in the GPU and a sub-module running in the CPU. Referring to FIG. 8, FIG. 8 is a functional implementation diagram of an exemplary water wave simulation module provided by an embodiment of this application. As shown in FIG. 8, on the one hand, a sub-module 8-1 running in the CPU in the water wave simulation module 7-41 is configured to realize a grid division of a water surface region to obtain a grid division result 8-11 (referred to as the plurality of grids to be rendered); on the other hand, is configured to resolve the fluctuation data at a grid level to obtain a coarse granularity fluctuation resolving result 8-12 (referred to as the grid fluctuation data set). On the one hand, a sub-module 8-2 running on the GPU in the water wave simulation module 7-41 is configured to read a water surface vertex 8-21 (referred to as the set of vertices to be rendered). On the other hand, it is configured to traverse the water surface vertex 8-21, resolve fluctuation data vertex-by-vertex (referred to as the vertex to be rendered) to obtain a fine granularity fluctuation resolving result 8-22 (referred to as the vertex fluctuation data set). Here, the coarse granularity fluctuation resolving result 8-12 is used for computing parameters such as the displacement (referred to as buoyancy parameters) through a buoyancy module 8-3 running on the CPU to obtain buoyancy 8-4 (referred to as the buoyancy information), and then a physics engine 8-5 running on the CPU determines motion information 8-6 of the virtual object interacting with the water surface based on the buoyancy 8-4. The fine granularity fluctuation resolving result 8-22 is used for rendering the water fluctuation effect, i.e., rendering a water surface ripple 8-7, through a water surface rendering module of the GPU.

The water wave simulation module 7-41 in FIG. 7 ensures the correctness of parameters such as the wave geometric effect of the water surface rendering and the displacement in physical resolving. Through the water wave simulation module 7-41, a real simulation of the water surface ripple may be performed according to parameters such as the wind direction, the wind power, the wave height, and the wavelength, and the water surface ripple can be correctly fed back to a rendering animation, and physical forces and motion postures of the interactive object (referred to as the virtual object interacting with the liquid surface to be rendered) at the same time.

Figure 9:
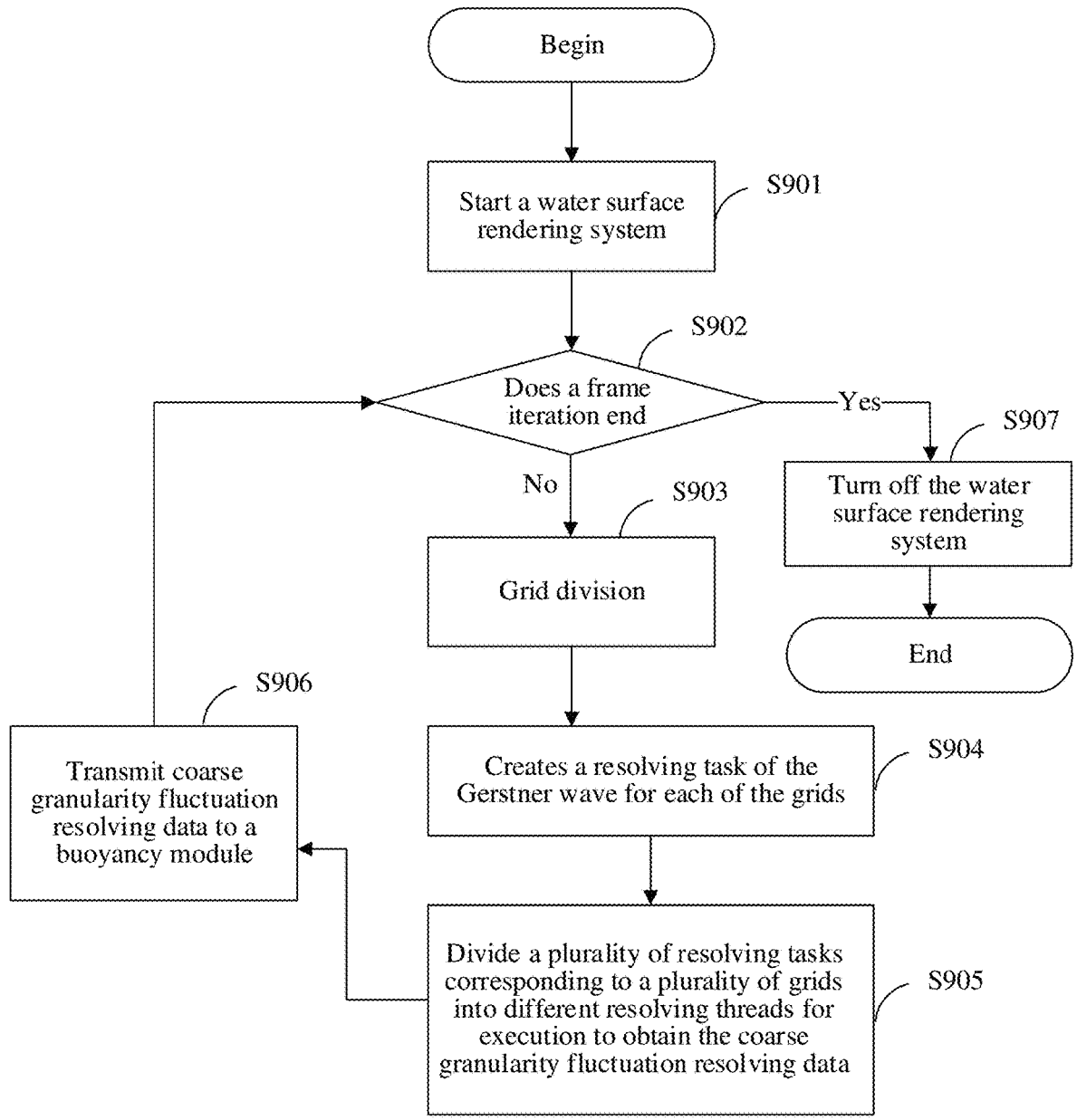
FIG. 9 is a flow diagram of an exemplary implementation of a sub-module running in a CPU provided by an embodiment of this application.

An implementation flow of the sub-module 8-1 running in the CPU in FIG. 8 is described below. Referring to FIG. 9, FIG. 9 is a flow diagram of an exemplary implementation of a sub-module running in a CPU provided by an embodiment of this application. As shown in FIG. 9, the exemplary implementation flow of the sub-module running in the CPU includes S901 to S907, and each step is respectively described below.

S901. The terminal (referred to as the rendering device) starts a water surface rendering system.

In embodiments of this application, the water surface rendering system 7-4 is started to start the flow of rendering of the water surface.

S902. The CPU determines whether a frame iteration of the water surface rendering ends. If so, S907 is performed. If not, S903 is performed.

It should be noted that, the water surface and the virtual object interacting with the water surface, are rendered frame-by-frame.

S903. The CPU performs a grid division on the water surface.

Here, the grid division is a voxelization process.

S904. The CPU creates a resolving task of the Gerstner wave (referred to as the first fluctuation data resolving task) for each of the grids.

S905. The CPU divides the plurality of resolving tasks corresponding to the plurality of grids into different resolving threads for execution to obtain coarse granularity fluctuation resolving data.

S906. The CPU transmits the coarse granularity fluctuation resolving data to the buoyancy module. Thereafter, S902 is performed.

The buoyancy module is a module running on the CPU configured to compute the buoyancy. Here, the buoyancy module computes the buoyancy based on the coarse granularity fluctuation resolving data and transmits the buoyancy to the physics engine such that the physics engine determines motion data of the virtual object on the water surface based on the buoyancy. The physics engine is also a module running on the CPU configured to determine motion information of the interactive object.

S907. The terminal turns off the water surface rendering system.

It should be noted that, the terminal ends the water surface rendering flow through turning off the water surface rendering system.

Figure 10:
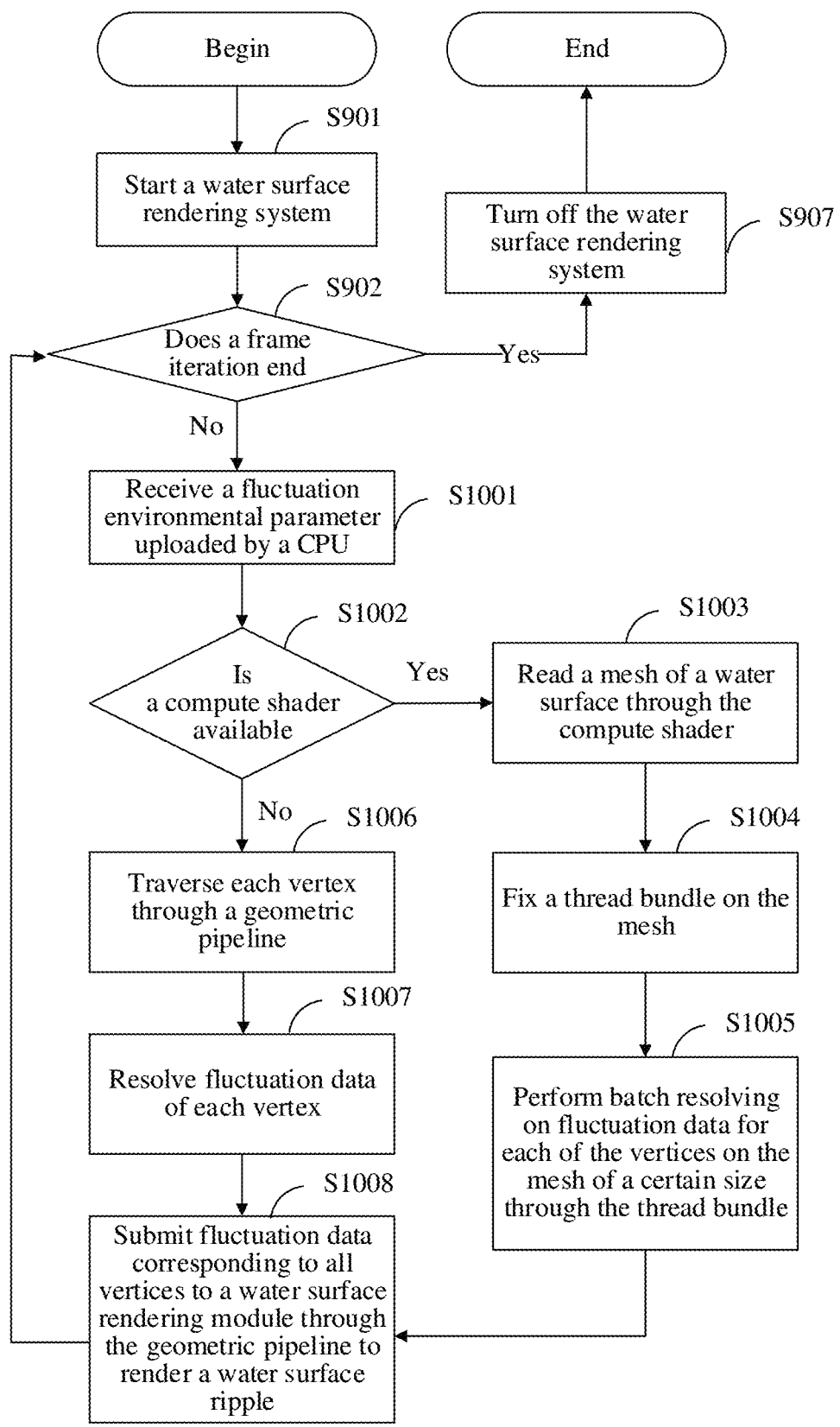
FIG. 10 is a flow diagram of an exemplary implementation of a sub-module running in a GPU provided by an embodiment of this application.

An implementation flow of the sub-module 8-2 running in the GPU in FIG. 8 is described below. Based on FIG. 9, referring to FIG. 10, FIG. 10 is a flow diagram of an exemplary implementation of a sub-module running in a GPU provided by an embodiment of this application. As shown in FIG. 10, the exemplary implementation flow of the sub-module running in the GPU includes S901, S902 and S907, and S1001 to S1008, and each step is respectively described below.

S1001. The GPU receives the fluctuation environmental parameters (including the environmental forces and the behavior of the virtual object in the virtual environment) uploaded by the CPU.

Here, when a result of performing S902 is determined to be NO, S1001 is performed.

S1002. The GPU determines whether the compute shader is available. If so, S1003 is performed. If not, S1006 is performed.

S1003. The GPU reads a mesh of the water surface (referred to as the mesh to be rendered) through the compute shader.

S1004. The GPU fixes the thread bundle on the mesh.

S1005. The GPU performs batch resolving on fluctuation data for each of the vertices on the mesh of a certain size (referred to as a specified number of vertices to be rendered) through the thread bundle. Thereafter, S1008 is performed.

S1006. The GPU traverses each of the vertices through the geometric pipeline.

S1007. The GPU resolves the fluctuation data of each of the vertices.

S1008. The GPU submits the fluctuation data corresponding to all vertices to the water surface rendering module through the geometric pipeline to render the water surface ripple. Thereafter, S902 is performed. The water surface rendering module is a module running on the GPU in the water wave simulation module 7-41.

It should be noted that, the execution processes of S903 to S906 and the execution processes of S1001 to S1008 are processed in parallel.

Figure 11:
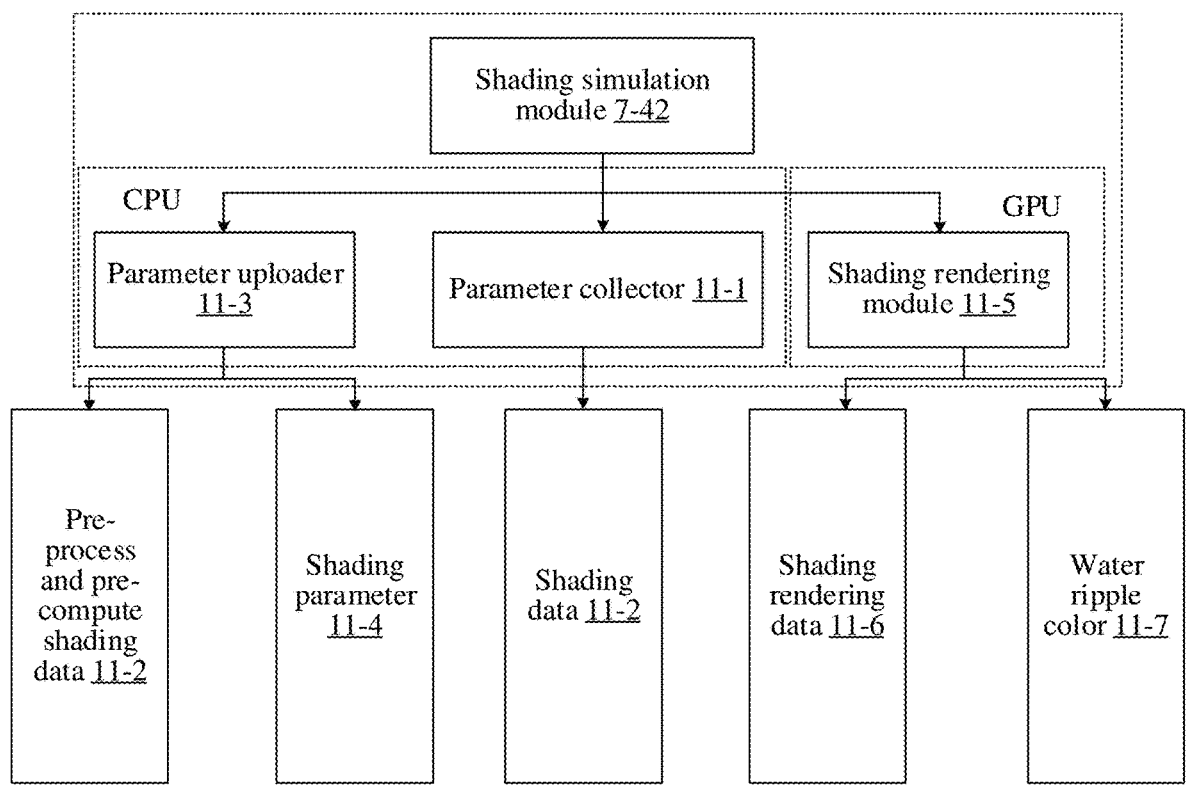
FIG. 11 is a diagram of an exemplary shading simulation module implementing water shading provided by an embodiment of this application.

In embodiments of this application, the shading simulation module 7-42 in FIG. 7 includes a GPU functional module (such as a GPU program), a parameter uploader, and a parameter collector; The GPU functional module runs on the GPU, and the parameter uploader and the parameter collector run on the CPU. Referring to FIG. 11, FIG. 11 is a diagram of an exemplary shading simulation module implementing water shading provided by an embodiment of this application. As shown in FIG. 11, a parameter collector 11-1 in the shading simulation module 7-42 is configured to gather rendered and simulated shading data 11-2 (referred to as the lighting environmental data). A parameter uploader 11-3 in the shading simulation module 7-42 is configured to pre-process and pre-compute the collected shading data 11-2 to obtain a shading parameter 11-4 (referred to as the light rendering parameter), and is also configured to upload the shading parameter 11-4 to a shading rendering module 11-5 in the shading simulation module 7-42. The shading rendering module 11-5 (referred to as the GPU functional module) in the shading simulation module 7-42 runs on the GPU and is configured to perform the lighting processing (including underwater scattering processing, water subsurface scattering processing, and water surface reflection processing) on fine granularity fluctuation resolving data read from the geometric pipeline based on the shading parameter 11-4 to obtain shading rendering data 11-6. It is also configured to render a water surface ripple color 11-7 based on the shading rendering data 11-6.

Figure 12:
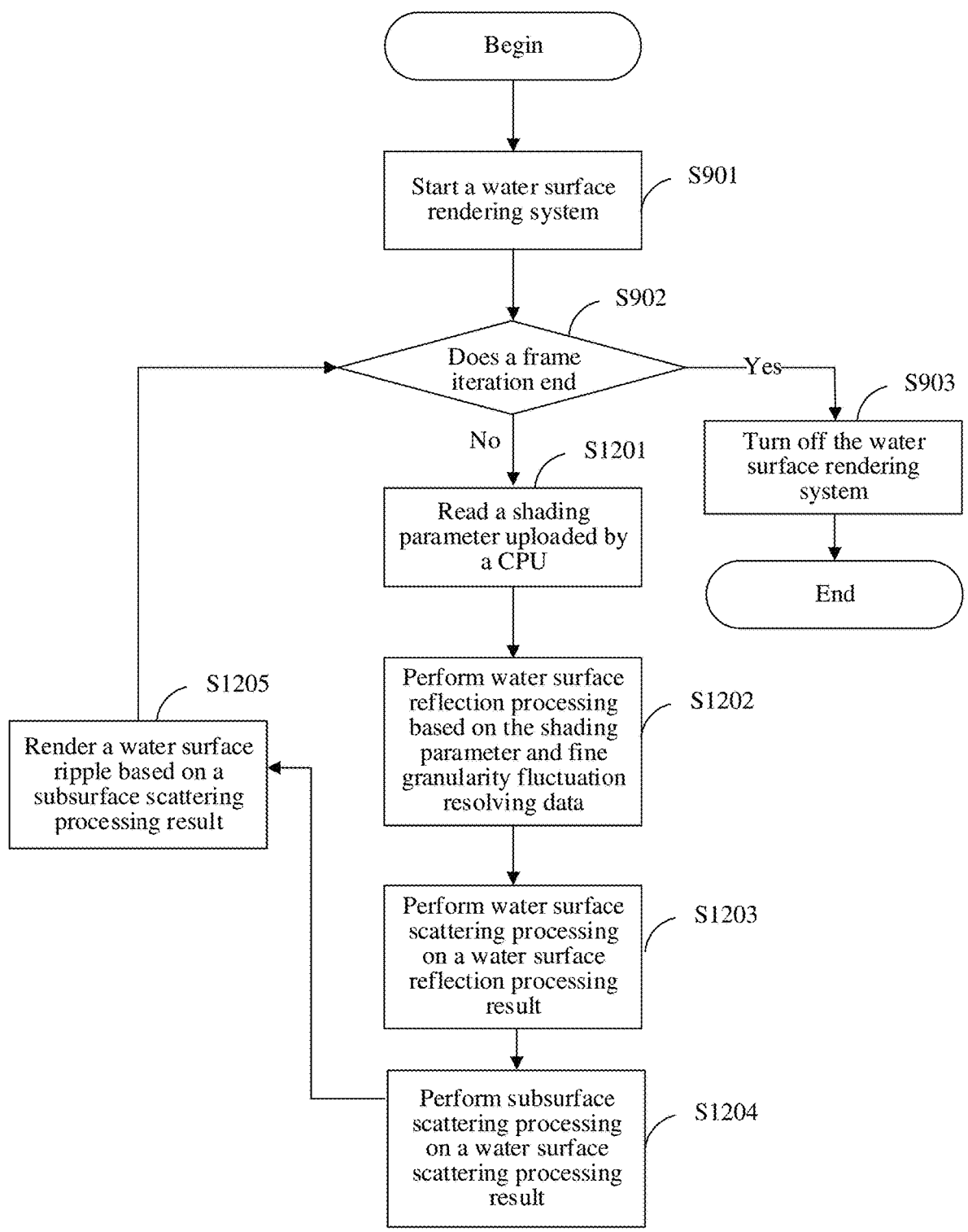
FIG. 12 is a flow diagram of an exemplary implementation of a shading rendering module provided by an embodiment of this application.

An implementation flow of the shading rendering module 11-5 running in the GPU in FIG. 11 is described below. Based on FIG. 9, referring to FIG. 12, FIG. 12 is a flow diagram of an exemplary implementation of a shading rendering module provided by an embodiment of this application. As shown in FIG. 12, the exemplary implementation flow of the shading rendering module running in the GPU includes S901, S902 and S907, and S1201 to S1205, and each step is respectively described below.

S1201. Read a shading parameter uploaded by the CPU.

Here, when a result of performing S902 is determined to be NO, S1201 is performed.

S1202. Perform the water surface reflection processing based on the shading parameter and the fine granularity fluctuation resolving data.

S1203. Perform the water surface scattering processing on a water surface reflection processing result.

S1204. Perform the subsurface scattering processing on a water surface scattering processing result.

S1205. Render the water surface ripple based on a subsurface scattering processing result. Thereafter, S902 is performed.

Rendering and other processing is implemented using the rasterization engine and the geometric pipeline on the GPU, and environmental data are collected by the CPU, and then the collected environmental parameters are uploaded to the GPU through the parameter uploader for reading and accessing by a shader program on the GPU.

Figure 13:
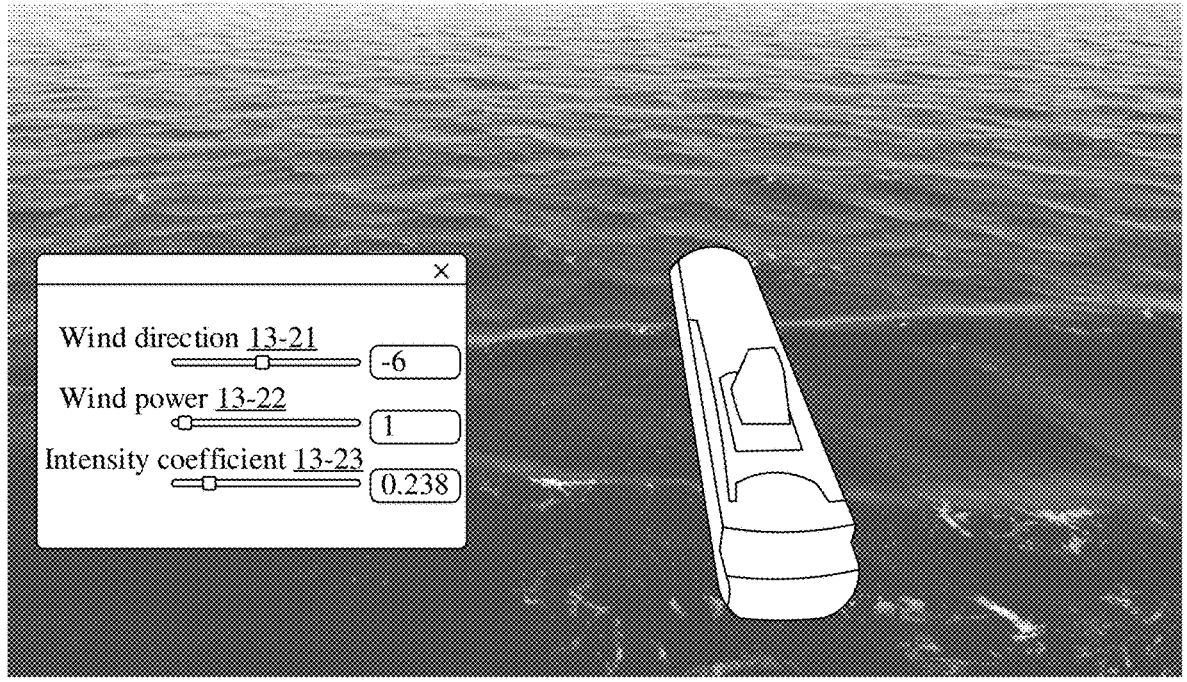
FIG. 13 is a diagram of an exemplary simulation of water fluctuations provided by an embodiment of this application.

The water fluctuation realized by the water wave simulation module 7-41 in FIG. 7 is described below with reference to FIG. 13 to FIG. 16. Referring to FIG. 13, FIG. 13 is a diagram of an exemplary simulation of water fluctuations provided by an embodiment of this application. As shown in FIG. 13, a water surface 13-1 is a rendering result when a wind direction 13-21 is forward (−6), a wind power 13-22 is level 1, and a water surface fluctuation intensity coefficient 13-23 is 0.238, where the wind direction 13-21, the wind power 13-22, and the water surface fluctuation intensity coefficient 13-23 are the environmental parameters 7-3 in FIG. 7.

Figure 14:
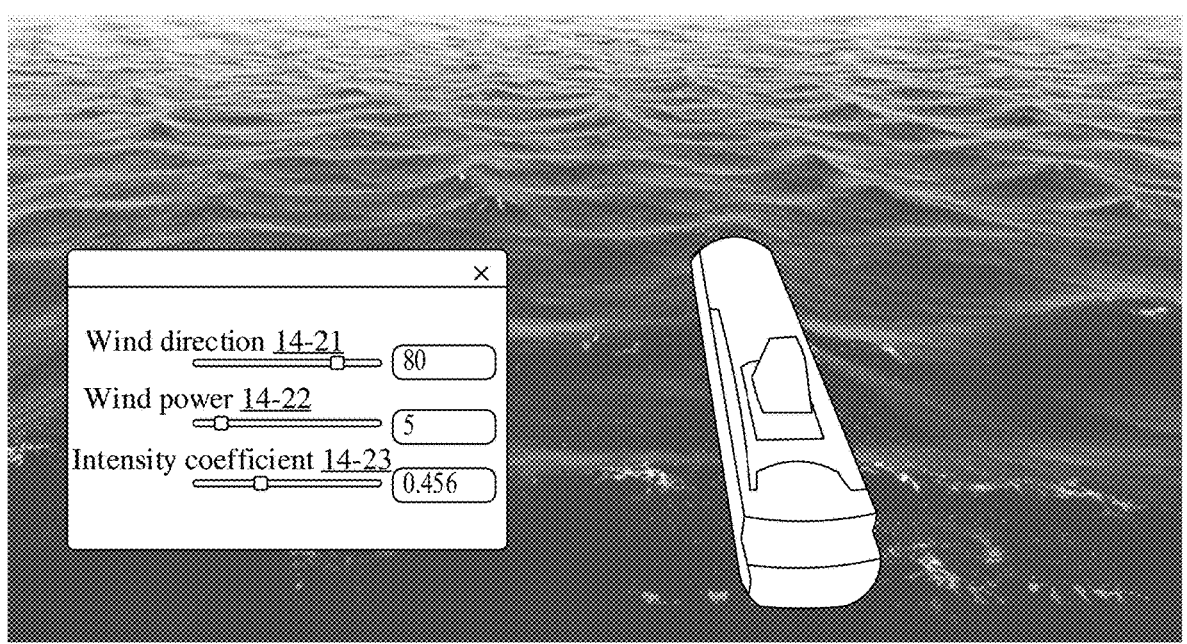
FIG. 14 is a diagram of another exemplary simulation of water fluctuations provided by an embodiment of this application.

Referring to FIG. 14, FIG. 14 is a diagram of another exemplary simulation of water fluctuations provided by an embodiment of this application. As shown in FIG. 14, a water surface 14-1 is a rendering result when a wind direction 14-21 is rightward (80), a wind power 14-22 is level 5, and a water surface fluctuation intensity coefficient 14-23 is 0.456.

It should be noted that, FIG. 13 and FIG. 14 are representations of the water fluctuations driven by the environmental parameter, that is to say, different fluctuation representations may be generated according to the wind power, the wind direction, and the water surface fluctuation intensity coefficient in the virtual environment.

Figure 15:
FIG. 15 is a diagram of yet another exemplary simulation of water fluctuations provided by an embodiment of this application.

Referring to FIG. 15, FIG. 15 is a diagram of yet another exemplary simulation of water fluctuations provided by an embodiment of this application. As shown in FIG. 15, a water surface 15-1 is a shore wave simulated in the case where wind conditions change.

Through the water wave simulation module 7-41 in FIG. 7, it is possible to generate various water surface ripples in response to rapid changes in the environment.

Figure 16:
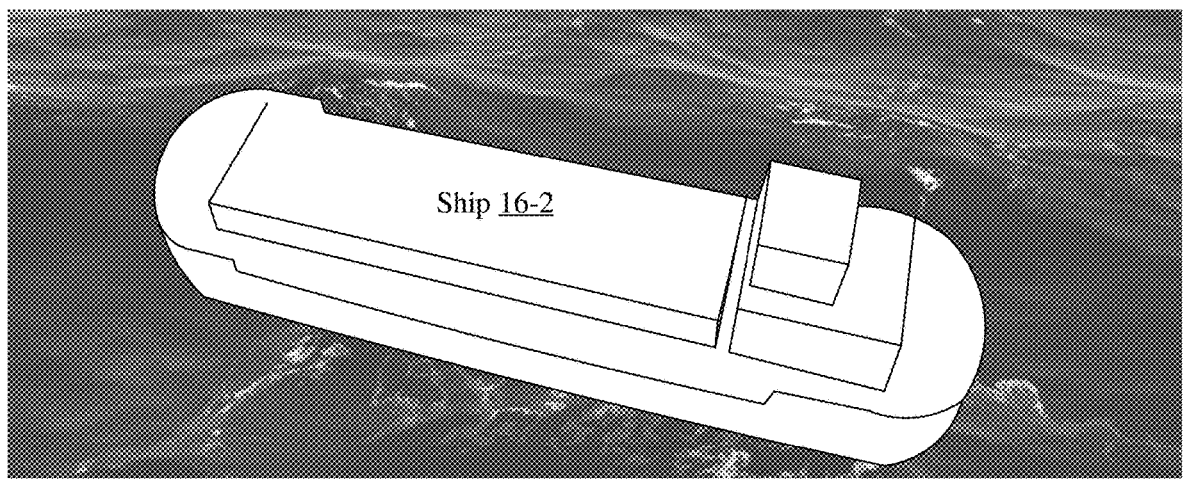
FIG. 16 is a diagram of an exemplary interaction of water fluctuations with a virtual object provided by an embodiment of this application.

Referring to FIG. 16, FIG. 16 is a diagram of an exemplary interaction of water fluctuations with a virtual object provided by an embodiment of this application. As shown in FIG. 16, there is shown a ship 16-2 on a water surface 16-1 that is inclined by an incoming sideward wave.

It is to be understood that the water surface rendering method based on the GPU and the CPU parallel rendering of fluctuation data provided by embodiments of this application can reduce the delay of a physical simulation and can respond to the physics engine in real time, reducing the rendering delay and improving the fidelity of the buoyancy effect.

The shading effect of the water fluctuation in the lighting environment realized by the shading simulation module 7-42 in FIG. 7 is described below with reference to FIG. 17 and FIG. 18.

Figure 17:
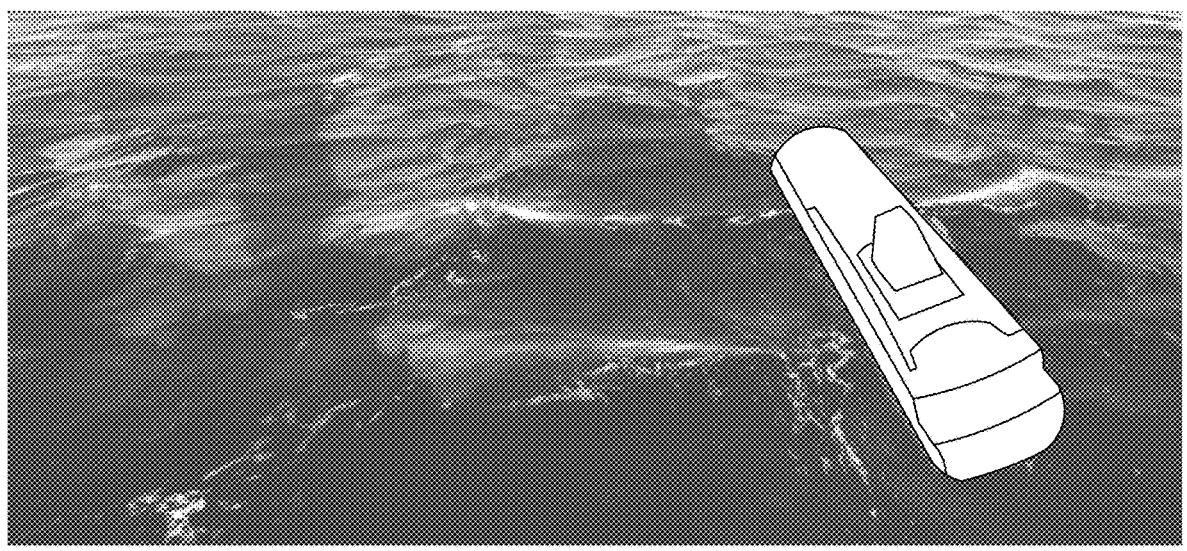
FIG. 17 is a diagram of an exemplary water surface lighting rendering effect provided by an embodiment of this application.

Referring to FIG. 17, FIG. 17 is a diagram of an exemplary water surface lighting rendering effect provided by an embodiment of this application. As shown in FIG. 17, a water surface 17-1 is a lighting shading simulation result in a clear daylight environment.

Figure 18:
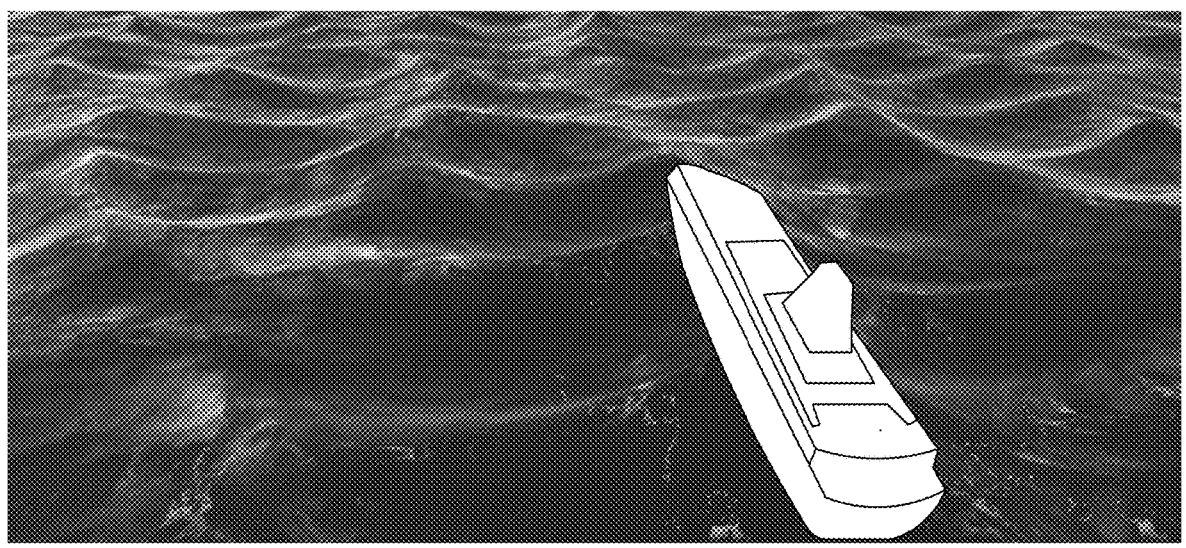
FIG. 18 is a diagram of another exemplary water surface lighting rendering effect provided by an embodiment of this application.

Referring to FIG. 18, FIG. 18 is a diagram of another exemplary water surface lighting rendering effect provided by an embodiment of this application. As shown in FIG. 18, a water surface 18-1 is a lighting shading simulation result in a dusky environment with heavy waves.

Through the shading simulation module provided by embodiments of this application, rendering effects in various lighting environments can be rendered based on changes, such as the scene (the sky environment), a main lighting intensity, a color, an angle, and a user setting.

The simulation method of the water surface ripple and the ripple color provided by embodiments of this application can combine with geometric and optical properties to improve the confidence of the water surface rendering and to improve the rendering effect of the water surface. In addition, through resolving the fluctuation data in parallel in the CPU and the GPU, the posture of the virtual object interacting with the water surface can be quickly obtained, and the rendering efficiency of the virtual object interacting with the water surface can be improved.

The following continues to describe an exemplary structure of the virtual scene-based rendering apparatus 455 implemented as the software module provided by embodiments of this application, in some embodiments, as shown in FIG. 4, the software module stored in the rendering apparatus 455 of the memory 450 may include:

a first resolving module 4551, configured to call the GPU to perform the following processing: resolving the vertex fluctuation data corresponding to each vertex to be rendered in the model to be rendered to obtain the vertex fluctuation data set corresponding to the model to be rendered;

a second resolving module 4552, configured to call the CPU to perform the following processing: dividing the model to be rendered into the plurality of grids to be rendered, and resolving the grid fluctuation data corresponding to each of the grids to be rendered to obtain the grid fluctuation data set corresponding to the plurality of grids to be rendered; and a data rendering module 4553, configured to call the GPU to perform the following processing: rendering a liquid surface to be rendered in a virtual scene based on the vertex fluctuation data set, and call the CPU to perform the following processing: rendering the virtual object interacting with the liquid surface to be rendered based on the grid fluctuation data set.

In embodiments of this application, the second resolving module 4552 is further configured to call the CPU to perform the following processing: creating the first fluctuation data resolving task for each of the grids to be rendered to obtain the plurality of first fluctuation data resolving tasks corresponding to the plurality of grids to be rendered, the first fluctuation data resolving task being used for resolving the grid fluctuation data of the grids to be rendered; dividing the plurality of first fluctuation data resolving tasks into at least one fluctuation data resolving thread; and performing the at least one fluctuation data resolving thread to obtain the grid fluctuation data set.

In embodiments of this application, the first resolving module 4551 is further configured to call the GPU to perform the following processing: traversing the set of vertices to be rendered corresponding to the model to be rendered; and resolving the vertex fluctuation data corresponding to each traversed vertex to be rendered to obtain the vertex fluctuation data set corresponding to the model to be rendered.

In embodiments of this application, the first resolving module 4551 is further configured to call the GPU to perform the following processing: dividing the set of vertices to be rendered corresponding to the model to be rendered based on the division unit to obtain the plurality of meshes to be rendered, the division unit including a specified number of the vertices to be rendered; creating the second fluctuation data resolving task for each of the vertices to be rendered in each of the meshes to be rendered to obtain the second fluctuation data resolving task group corresponding to the meshes to be rendered, the plurality of meshes to be rendered corresponding to the plurality of second fluctuation data resolving task groups, and the second fluctuation data resolving task being used for resolving the vertex fluctuation data corresponding to each of the vertices to be rendered; and performing the plurality of second fluctuation data resolving task groups to obtain the vertex fluctuation data set corresponding to the model to be rendered.

In embodiments of this application, the rendering apparatus 455 further includes the shading rendering module 4554, configured to call the GPU to perform the following processing: determining the shading rendering data corresponding to the vertex fluctuation data set.

In embodiments of this application, the data rendering module 4553 is further configured to call the GPU to perform the following processing: combining the shading rendering data and the vertex fluctuation data set to render the liquid surface to be rendered.

In embodiments of this application, the shading rendering module 4554 is further configured to call the CPU to perform the following processing: gathering the lighting environmental data, the lighting environmental data including at least one of scene environmental data, lighting intensity, lighting color, lighting angle, and lighting behavior data; converting the lighting environmental data into the light rendering parameter; transmitting the light rendering parameter to the GPU.

In embodiments of this application, the shading rendering module 4554 is further configured to call the GPU to perform the following processing: determining the shading rendering data corresponding to the vertex fluctuation data set based on the light rendering parameter.

In embodiments of this application, the shading rendering module 4554 is further configured to call the GPU to perform the following processing: traversing the vertex fluctuation data set; and performing lighting processing on each traversed vertex fluctuation data to obtain the shading rendering data corresponding to the vertex fluctuation data set, the lighting processing including at least one of under-surface scattering processing, subsurface scattering processing, and surface reflection processing.

In embodiments of this application, the rendering apparatus 455 further includes the parameter acquisition module 4555, configured to call the CPU to perform the following processing: in response to an $i^{th}$ frame rendering request of the liquid surface to be rendered in the virtual scene, performing, the CPU performing the following processing, i being a monotonically increasing positive integer variable: acquiring the fluctuation environmental data, the fluctuation environmental data including at least one of the wind direction, the wind power, the wave height, the wavelength, and the fluctuation behavior data; converting the fluctuation environmental data into the fluctuation environmental parameter; transmitting the fluctuation environmental parameter to the GPU.

In embodiments of this application, the first resolving module 4551 is further configured to call the GPU to perform the following processing: resolving the vertex fluctuation data corresponding to each of the vertices to be rendered in the model to be rendered based on the fluctuation environmental parameter.

In embodiments of this application, the second resolving module 4552 is further configured to call the CPU to perform the following processing: resolving the grid fluctuation data corresponding to each of the grids to be rendered based on the fluctuation environmental parameter.

In embodiments of this application, the second resolving module 4552 is further configured to call the CPU to perform the following processing: determining the grid division unit based on the thread processing size and the model to be rendered, the thread processing size being a maximum number of threads processed by the CPU; and dividing the model to be rendered into the plurality of grids to be rendered based on the grid division unit.

In embodiments of this application, the data rendering module 4553 is further configured to call the CPU to perform the following processing: determining the buoyancy parameter based on the grid fluctuation data set; determining the buoyancy information corresponding to the liquid surface to be rendered based on the buoyancy parameter; calling the physics engine to perform the following processing: determining the motion information for the virtual object interacting with the liquid surface to be rendered based on the buoyancy information, the physics engine being called by the CPU; rendering the virtual object based on the motion information.

In embodiments of this application, the second resolving module 4552 is further configured to call the CPU to perform the following processing in the process of calling the GPU to acquire the vertex fluctuation data set: dividing the model to be rendered into the plurality of grids to be rendered, and resolving the grid fluctuation data corresponding to each of the grids to be rendered to obtain the grid fluctuation data set corresponding to the plurality of grids to be rendered.

Embodiments of this application provide a computer program product or computer program including a computer-executable instruction stored in a computer-readable storage medium. A processor (including the GPU and the CPU) of an electronic device (referred to as the rendering device) reads the computer-executable instruction from the computer-readable storage medium, and the processor executes the computer-executable instruction to cause the electronic device to perform the above-mentioned virtual scene-based rendering method in embodiments of this application.

Embodiments of this application provide a computer-readable storage medium storing a computer-executable instruction, the computer-executable instruction, when executed by a processor, cause the processor to perform the virtual scene-based rendering method provided by embodiments of this application, such as the virtual scene-based rendering method shown in FIG. 5.

In some embodiments, the computer-readable storage medium may be a memory such as FRAM, ROM, PROM, EPROM, EEPROM, flash memory, magnetic surface storage, optical disk, or CD-ROM; may also be various devices including one or any combination of the above-mentioned memories.

In some embodiments, the computer-executable instruction may be written in the form of programs, software, software modules, scripts, or code in any form of programming language (including compiled or interpreted languages, or declarative or procedural languages), and may be deployed in any form, including as stand-alone programs or as modules, components, subroutines, or other units suitable for use in a computing environment.

As an example, the computer-executable instructions may, but need not, correspond to files in a file system, may be stored in a portion of a file that holds other programs or data, e.g., in one or more scripts in a hyper text markup language (HTML) document, in a single file dedicated to the program in question, or in multiple coordinated files (e.g., files that store one or more modules, subroutines, or portions of code).

As an example, the computer-executable instructions may be deployed to be executed on one electronic device (in this case, the one electronic device is the rendering device), or on a plurality of electronic devices located at one site (in this case, the plurality of electronic devices located at one site are the rendering devices), or on a plurality of electronic devices distributed at a plurality of sites and interconnected by a communication network (in this case, the plurality of electronic devices distributed at the plurality of sites and interconnected by the communication network are the rendering devices).

It is to be understood that in embodiments of this application, reference to relevant data, when embodiments of this application are applied to a particular product or technology, require user permission or consent and that the collection, use, and processing of relevant data requires compliance with relevant national and regional laws and regulations and standards.

In summary, in the process of resolving the fluctuation data of the liquid surface to be rendered by the GPU, embodiments of this application also perform the resolving of the coarse granularity on the fluctuation data of the liquid surface to be rendered by the CPU. Accordingly, while the GPU realizes the high confidence rendering of the liquid surface to be rendered, the CPU can render the virtual object interacting with the liquid surface to be rendered based on the fluctuation data of the coarse granularity resolved by the CPU. Thus, since the rendering of the liquid surface to be rendered implemented by the GPU is implemented based on data resolved by the GPU, and the rendering of the virtual object interacting with the liquid surface to be rendered implemented by the CPU is implemented based on data resolved by the CPU; That is to say, the CPU and the GPU may implement rendering only based on data resolved by themselves, thereby improving the stability of rendering performance. In addition, while the GPU resolves the fluctuation data for rendering the ripples of the liquid surface to be rendered, the CPU resolves the fluctuation data for rendering the posture of the virtual object interacting with the liquid surface to be rendered, thereby enabling parallel rendering of the liquid surface to be rendered and the virtual object interacting with the liquid surface to be rendered, improving resource utilization.

The foregoing descriptions are merely preferred embodiments of this application and are not intended to limit the protection scope of this application. Any modifications, equivalent substitutions, and improvements made within the spirit and scope of this application are covered by the scope of protection of this application.

What is claimed is:

1. A virtual scene-based rendering method, comprising:
dividing, by a graphics processing unit (GPU), a set of vertices to be rendered corresponding to a model to be rendered based on a division unit to obtain a plurality of meshes to be rendered, the division unit comprising a specified number of vertices to be rendered;
creating, by the GPU, a first fluctuation data resolving task for each vertex to be rendered in each of the plurality of meshes to be rendered to obtain a first fluctuation data resolving task group corresponding to the plurality of meshes to be rendered, the plurality of meshes to be rendered corresponding to a plurality of first fluctuation data resolving task groups, and the first fluctuation data resolving task being used to resolve vertex fluctuation data corresponding to each vertex to be rendered;
performing, by the GPU, the plurality of first fluctuation data resolving task groups to obtain a vertex fluctuation data set corresponding to the model to be rendered;
dividing, by a central processing unit (CPU), the model to be rendered into a plurality of grids to be rendered, and resolving grid fluctuation data corresponding to each of the plurality of grids to be rendered to obtain a grid fluctuation data set corresponding to the plurality of grids to be rendered;
rendering, by the GPU, a liquid surface to be rendered in a virtual scene based on the vertex fluctuation data set; and
rendering, by the CPU, a virtual object for interacting with the liquid surface to be rendered based on the grid fluctuation data set, wherein the grid fluctuation data set is used for determining motion information of the virtual object interacting with the liquid surface to be rendered.

2. The method according to claim 1, wherein resolving the grid fluctuation data corresponding to each of the plurality of grids to be rendered to obtain the grid fluctuation data set corresponding to the plurality of grids to be rendered comprises:
creating a second fluctuation data resolving task for each of the plurality of grids to be rendered to obtain a plurality of second fluctuation data resolving tasks corresponding to the plurality of grids to be rendered, each of the second fluctuation data resolving task being used to resolve the grid fluctuation data of each of the plurality of grids to be rendered;
dividing the plurality of second fluctuation data resolving tasks into at least one fluctuation data resolving thread; and
performing the at least one fluctuation data resolving thread to obtain the grid fluctuation data set.

3. The method according to claim 1, wherein performing, by the GPU, the plurality of first fluctuation data resolving task groups to obtain the vertex fluctuation data set corresponding to the model to be rendered comprises:
traversing the set of vertices to be rendered corresponding to the model to be rendered; and
resolving the vertex fluctuation data corresponding to each traversed vertex to be rendered to obtain the vertex fluctuation data set corresponding to the model to be rendered.

4. The method according to claim 1, wherein after performing, by the GPU, the plurality of first fluctuation data resolving task groups to obtain the vertex fluctuation data set corresponding to the model to be rendered, the method further comprises:
determining, by the GPU, shading rendering data corresponding to the vertex fluctuation data set,
wherein rendering the liquid surface in the virtual scene based on the vertex fluctuation data set comprises:
rendering the liquid surface to be rendered in the virtual scene in conjunction with the shading rendering data and the vertex fluctuation data set.

5. The method according to claim 4, wherein before determining shading rendering data corresponding to the vertex fluctuation data set, the method further comprises:
gathering, by the CPU, lighting environmental data, the lighting environmental data comprising at least one of scene environmental data, lighting intensity, lighting color, lighting angle, and lighting behavior data;
converting, by the CPU, the lighting environmental data into a light rendering parameter;
transmitting, by the CPU, the light rendering parameter to the GPU,
wherein determining the shading rendering data corresponding to the vertex fluctuation data set comprises:
determining the shading rendering data corresponding to the vertex fluctuation data set based on the light rendering parameter.

6. The method according to claim 4, wherein determining shading rendering data corresponding to the vertex fluctuation data set comprises:
traversing the vertex fluctuation data set; and
performing lighting processing on each traversed vertex fluctuation data to obtain the shading rendering data corresponding to the vertex fluctuation data set, the lighting processing including at least one of undersurface scattering processing, subsurface scattering processing, and surface reflection processing.

7. The method according to claim 1, wherein before performing, by the GPU, the plurality of first fluctuation data resolving task groups to obtain the vertex fluctuation data set corresponding to the model to be rendered, the method further comprises:
in response to an ith frame rendering request of the liquid surface to be rendered in the virtual scene, performing, by the CPU, the following processing, i being a monotonically increasing positive integer variable:
acquiring, by the CPU, fluctuation environmental data, the fluctuation environmental data comprising at least one of a wind direction, a wind power, a wave height, a wavelength, and fluctuation behavior data;
converting, by the CPU, the fluctuation environmental data into a fluctuation environmental parameter; and
transmitting, by the CPU, the fluctuation environmental parameter to the GPU,
wherein i is a monotonically increasing positive integer variable,
wherein performing, by the GPU, the plurality of first fluctuation data resolving task groups to obtain the vertex fluctuation data set corresponding to the model to be rendered comprises:
resolving the vertex fluctuation data corresponding to each vertex to be rendered in the model to be rendered based on the fluctuation environmental parameter, and
wherein resolving grid fluctuation data corresponding to each of the grids to be rendered, comprises:

resolving the grid fluctuation data corresponding to each of the grids to be rendered based on the fluctuation environmental parameter.

8. The method according to claim 1, wherein dividing the model to be rendered into the plurality of grids to be rendered comprises:
determining a grid division unit based on a thread processing size and the model to be rendered, the thread processing size being a maximum number of threads processed by the CPU; and
dividing the model to be rendered into the plurality of grids to be rendered based on the grid division unit.

9. The method according to claim 1, wherein rendering the virtual object for interacting with the liquid surface to be rendered based on the grid fluctuation data set comprises:
determining a buoyancy parameter based on the grid fluctuation data set;
determining buoyancy information corresponding to the liquid surface to be rendered based on the buoyancy parameter;
calling a physics engine to determine motion information for the virtual object interacting with the liquid surface to be rendered based on the buoyancy information; and
rendering the virtual object based on the motion information.

10. The method according to claim 1, wherein dividing, by the CPU, the model to be rendered into the plurality of grids to be rendered, and resolving the grid fluctuation data corresponding to each of the plurality of grids to be rendered to obtain the grid fluctuation data set corresponding to the plurality of grids to be rendered comprises:
while the GPU acquires the vertex fluctuation data set, dividing, by the CPU, the model to be rendered into the plurality of grids to be rendered, and resolving the grid fluctuation data corresponding to each of the plurality of grids to be rendered to obtain the grid fluctuation data set corresponding to the plurality of grids to be rendered.

11. The method according to claim 1, wherein before the vertex fluctuation data corresponding to each vertex to be rendered in the model to be rendered is resolved, the CPU is configured to:
in response to an ith frame rendering request of the liquid surface to be rendered in the virtual scene:
acquire fluctuation environmental data comprising at least one of a wind direction, a wind power, a wave height, a wavelength, or fluctuation behavior data;
convert the fluctuation environmental data into a fluctuation environmental parameter; and
transmit the fluctuation environmental parameter to the GPU,
wherein i is a monotonically increasing positive integer variable,
wherein in order to resolve the vertex fluctuation data corresponding to each vertex to be rendered in the model to be rendered, the GPU is configured to:
resolve the vertex fluctuation data corresponding to each vertex to be rendered in the model to be rendered based on the fluctuation environmental parameter, and
wherein in order to resolve the grid fluctuation data corresponding to each of the grids to be rendered, the CPU is configured to:
resolve the grid fluctuation data corresponding to each of the grids to be rendered based on the fluctuation environmental parameter.

12. A virtual scene-based rendering apparatus, comprising:
a graphics processing unit (GPU) configured to:
divide, by a graphics processing unit (GPU), a set of vertices to be rendered corresponding to a model to be rendered based on a division unit to obtain a plurality of meshes to be rendered, the division unit comprising a specified number of vertices to be rendered;
create, by the GPU, a first fluctuation data resolving task for each vertex to be rendered in each of the plurality of meshes to be rendered to obtain a first fluctuation data resolving task group corresponding to the plurality of meshes to be rendered, the plurality of meshes to be rendered corresponding to a plurality of first fluctuation data resolving task groups, and the first fluctuation data resolving task being used to resolve vertex fluctuation data corresponding to each vertex to be rendered;
perform, by the GPU, the plurality of first fluctuation data resolving task groups to obtain a vertex fluctuation data set corresponding to the model to be rendered; and
render a liquid surface to be rendered in a virtual scene-based on the vertex fluctuation data set; and
a central processing unit (CPU) configured to:
divide the model to be rendered into a plurality of grids to be rendered, and resolve grid fluctuation data corresponding to each of the plurality of grids to be rendered to obtain a grid fluctuation data set corresponding to the plurality of grids to be rendered; and
render a virtual object for interacting with the liquid surface to be rendered based on the grid fluctuation data set, wherein the grid fluctuation data set is used for determining motion information of the virtual object interacting with the liquid surface to be rendered.

13. The apparatus according to claim 12, wherein in order to resolve the grid fluctuation data corresponding to each of the plurality of grids to be rendered to obtain the grid fluctuation data set corresponding to the plurality of grids to be rendered, the CPU is configured to:
create a second fluctuation data resolving task for each of the plurality of grids to be rendered to obtain a plurality of second fluctuation data resolving tasks corresponding to the plurality of grids to be rendered, each of the second fluctuation data resolving task being used to resolve the grid fluctuation data of each of the plurality of grids to be rendered;
divide the plurality of second fluctuation data resolving tasks into at least one fluctuation data resolving thread; and
perform the at least one fluctuation data resolving thread to obtain the grid fluctuation data set.

14. The apparatus according to claim 12, wherein in order to perform, by the GPU, the plurality of first fluctuation data resolving task groups to obtain the vertex fluctuation data set corresponding to the model to be rendered, the GPU is configured to:
traverse the set of vertices to be rendered corresponding to the model to be rendered; and
resolve the vertex fluctuation data corresponding to each traversed vertex to be rendered to obtain the vertex fluctuation data set corresponding to the model to be rendered.

15. The apparatus according to claim 12, wherein after the plurality of first fluctuation data resolving task groups to obtain the vertex fluctuation data set corresponding to the model to be rendered is performed, the GPU is configured to:
- determine shading rendering data corresponding to the vertex fluctuation data set; and
- in order to render the liquid surface to be rendered in the virtual scene based on the vertex fluctuation data set, render the liquid surface in the virtual scene in conjunction with the shading rendering data and the vertex fluctuation data set.

16. The apparatus according to claim 12, wherein in order to divide the model to be rendered into the plurality of grids to be rendered, the CPU is configured to:
- determine a grid division unit based on a thread processing size and the model to be rendered, the thread processing size being a maximum number of threads processed by the CPU; and
- divide the model to be rendered into the plurality of grids to be rendered based on the grid division unit.

17. The apparatus according to claim 12, wherein in order to render the virtual object for interacting with the liquid surface to be rendered based on the grid fluctuation data set, the CPU is configured to:
- determine a buoyancy parameter based on the grid fluctuation data set;
- determine buoyancy information corresponding to the liquid surface to be rendered based on the buoyancy parameter;
- call a physics engine to determine motion information for the virtual object interacting with the liquid surface to be rendered based on the buoyancy information; and
- render the virtual object based on the motion information.

18. A non-transitory computer-readable storage medium storing a plurality of instructions executable by a graphics processing unit (GPU) and a central processing unit (CPU), wherein upon execution, the plurality of instructions is configured to cause the GPU to:
- divide, by a graphics processing unit (GPU), a set of vertices to be rendered corresponding to a model to be rendered based on a division unit to obtain a plurality of meshes to be rendered, the division unit comprising a specified number of vertices to be rendered;
- create, by the GPU, a first fluctuation data resolving task for each vertex to be rendered in each of the plurality of meshes to be rendered to obtain a first fluctuation data resolving task group corresponding to the plurality of meshes to be rendered, the plurality of meshes to be rendered corresponding to a plurality of first fluctuation data resolving task groups, and the first fluctuation data resolving task being used to resolve vertex fluctuation data corresponding to each vertex to be rendered;
- perform, by the GPU, the plurality of first fluctuation data resolving task groups to obtain a vertex fluctuation data set corresponding to the model to be rendered; and
- render a liquid surface to be rendered in a virtual scene-based on the vertex fluctuation data set; and the plurality of instructions is configured to cause the CPU to:
- divide the model to be rendered into a plurality of grids to be rendered, and resolve grid fluctuation data corresponding to each of the plurality of grids to be rendered to obtain a grid fluctuation data set corresponding to the plurality of grids to be rendered; and
- render a virtual object for interacting with the liquid surface to be rendered based on the grid fluctuation data set, wherein the grid fluctuation data set is used for determining motion information of the virtual object interacting with the liquid surface to be rendered.

* * * * *